(12) United States Patent
Hawk et al.

(10) Patent No.: US 11,353,152 B1
(45) Date of Patent: Jun. 7, 2022

(54) FLUID TRANSFER COUPLINGS AND METHODS THEREFOR

(71) Applicant: United States of America as represented by the Administrator of NASA, Washington, DC (US)

(72) Inventors: Douglas Hawk, Beltsville, MD (US); Hans Raven, Beltsville, MD (US); Matthew Ashmore, Beltsville, MD (US); Hsiao Smith, Greenbelt, MD (US); Tim Horner, Beltsville, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 56 days.

(21) Appl. No.: 16/831,959

(22) Filed: Mar. 27, 2020

Related U.S. Application Data

(63) Continuation-in-part of application No. 15/280,280, filed on Sep. 29, 2016, now Pat. No. 10,604,281.
(Continued)

(51) Int. Cl.
*F16L 37/40* (2006.01)
*F16L 53/35* (2018.01)
(Continued)

(52) U.S. Cl.
CPC .............. *F16L 37/40* (2013.01); *B64G 1/648* (2013.01); *F16L 53/35* (2018.01); *F16L 58/185* (2013.01); *F16L 2201/40* (2013.01)

(58) Field of Classification Search
CPC ......... F16L 37/40; F16L 58/185; F16L 53/35; F16L 2201/40; F16L 53/37; F16L 53/38; B64G 1/648
(Continued)

(56) References Cited

U.S. PATENT DOCUMENTS

| | | | |
|---|---|---|---|
| 5,107,891 A ‡ | 4/1992 | Abe | B23K 37/006 137/456 |
| 7,063,328 B2 ‡ | 6/2006 | Smith, III | F16L 1/26 277/607 |

(Continued)

*Primary Examiner* — Michael R Reid
(74) *Attorney, Agent, or Firm* — Matthew F. Johnston; Bryan A. Geurts; Helen M. Gaius

(57) ABSTRACT

The present invention relates to couplers for transferring fluid between space assets, particularly in a vacuum microgravity environment with radiation exposure. In particular, the couplers provide for transfer of fluids, such as propellants, coolants, pressurant gases, or life-support fluids, preferably between assets in the space environment or in terrestrial environments such as Earth, the Moon, or Mars. The couplers provide self-alignment features which enable their use in blind-mate, telerobotic, fully autonomous robotic systems. The invention provides a common design architecture for different fluids accommodating a variety of flow rates and pressure drops depending upon the particular fluid. The basic wetted component design of the invention involves a rigid, centrally-disposed nozzle on the Passive Side which contacts and opens a poppet valve on the Active Side as the two sides are coupled; and a rigid annular nozzle on the Active Side, coaxially located with but occupying a different radius than the Passive Side nozzle, which contacts and opens a corresponding contamination cover on the Passive Side.

14 Claims, 9 Drawing Sheets

Related U.S. Application Data

(60) Provisional application No. 62/937,569, filed on Nov. 19, 2019.

(51) Int. Cl.
*B64G 1/64* (2006.01)
*F16L 58/18* (2006.01)

(58) Field of Classification Search
USPC .......................................................... 137/341
See application file for complete search history.

(56) References Cited

U.S. PATENT DOCUMENTS

| | | | | |
|---|---|---|---|---|
| 7,849,873 | B2 * | 12/2010 | Hiratsuka | F16K 49/00 137/341 |
| 8,689,828 | B2 ‡ | 4/2014 | Smith, III | F16K 17/168 137/614.04 |
| 9,423,185 | B2 * | 8/2016 | Yamakage | F28D 15/0233 |
| 9,534,720 | B2 * | 1/2017 | Reasoner | F16L 37/091 |
| 10,267,448 | B2 * | 4/2019 | Ackerman | F16D 66/00 |
| 2011/0180165 | A1 * | 7/2011 | Hansson | F16K 1/36 137/554 |
| 2013/0220482 | A1 ‡ | 8/2013 | Fuhrig | B65B 31/00 141/18 |

\* cited by examiner
‡ imported from a related application

FLUID TRANSFER COUPLINGS AND METHODS THEREFOR

PRIORITY

This is a continuation-in-part application of U.S. Ser. No. 15/280,280 entitled "Cooperative Service Valve for Satellite Media Transfer" filed on Sep. 29, 2016 and its contents are hereby incorporated herein by reference in its entirely. This application also claims benefit to provisional application U.S. No. 62/937,569, filed on Nov. 19, 2019 entitled "Fluid Transfer Couplings and Methods Therefor" and is hereby incorporated herein by reference in its entirely.

FIELD OF THE INVENTION

The present invention relates to couplers for transferring fluid between space assets, particularly in a vacuum microgravity environment with radiation exposure. In particular, the couplers provide for transfer of fluids, such as propellants, coolants, pressurant gases, or life-support fluids, preferably between assets in the space environment or in terrestrial environments such as Earth, the Moon, or Mars. The couplers provide self-alignment features which enable their use in blind-mate, telerobotic, or fully autonomous robotic systems.

BACKGROUND

Satellites have for many years been delivered to orbit with a fixed supply of fuel that, when depleted, eliminates the satellite's ability to perform orbit maintenance and mission-related attitude adjustments. Depending on the asset's orbit, a small reserve of propellant is maintained either to boost the satellite to a disposal orbit or to perform a re-entry burn for destructive disposal in Earth's atmosphere. Thus, a potential, and likely, end-of-life event for a satellite is the depletion of propellant. Historically, satellites which consume all of their launched propellant, but whose hardware and software components are otherwise still functioning properly, will be decommissioned or de-orbited because the lack of onboard propellant does not permit continued proper spacecraft attitude and navigational control.

However, modern satellites and other space assets, such as space vehicles and orbiting stations, are being designed for longer life and with mission concepts of operations that baseline regular replenishment of consumables such as propellants, pressurant gases and coolants. In addition to replenishment of consumables, the paradigm shift in space mission design to in-space manufacturing and assembly results in mission architectures in which large space structures—habitable stations, planet-finding observatories, vehicle refueling depots, etc.—are assembled in orbit from a variety of smaller modules. Rather than outfitting each module with its own self-contained propulsion or cooling system, cost and complexity can be reduced if the fluid containment and pumping system is located at a single interface. Therefore, a means to establish fluid communication between assembled modules is necessary. A primary example of this need can be found in a multi-module habitat, where coolant and other life-support fluids may need to be circulated through all of the modules from a centralized pumping source. Those skilled in the art will recognize the need and application for similar intra-module transfer of propellants, pressurants, and cryogens. A fluid coupling which can be mated after connection (docking or berthing) of modules enables this transfer, much in the same way that an electrical umbilical enables power and data transfer between assembled components.

An additional advantage is offered by a design solution which can serve as both an intra-module fluid transfer coupling and an externally accessed refueling coupling. This permits communication of fluid media between modules but also allows replenishment of the fluid supply by, for example, a visiting logistics module or a refueling vehicle. If the coupling is designated to be strictly a robotic interface, actuated only by means of bringing the modules to dock or via a robotic servicer arm/vehicle equipped with the complementary fluid interface, then the multi-barrier rules for human operator safety may be relaxed and the design of the fluid coupling simplified. The primary means to transfer media into a space asset's propulsion system is via a standard Fill and Drain Valve (FDV). Current robotic servicing tools and techniques that have been demonstrated on commercial satellite FDVs have expended much system cost and complexity in dealing with the features that render spacecraft fluid interfaces safe for human access, such as cutting of safety lock wire, removal of multiple redundant closeout caps, and robotically interfacing to small threaded features which do not possess anti-cross-threading characteristics. These types of interfaces remain essential for loading of propellants prior to launch, but an alternate interface may be provided for robotic acquisition and replenishment of propellants (and other media) once in orbit. Further, while some have displayed the ability to interface with current FDVs in orbit, the fact remains that current FDVs and their respective satellites were never designed to be manipulated in-orbit, nor were they intended to be accessed robotically. The FDV has historically been designed around ground-based use by a human operator wearing personal protective equipment.

In addition to the operational and interface complexities provided by the various safety features incorporated into the construction of commercial FDVs, robotic or blind acquisition of these interfaces is further complicated by the lack of dedicated alignment features; nor do spacecraft commonly possess alignment aids—visual or physical—on or within the surrounding structure. Although it is possible to use existing features and geometry, testing has indicated that dedicated alignment features aid robotic operations, promote correct orientation of mating interfaces, and thus decrease operation timelines and the possibility of reattempts to correct for misalignments.

In a blind-mate scenario, for example when two orbiting station modules are brought together, one module may be at a significantly different temperature than its counterpart. The docking features on a habitable module are large—of sufficient diameter to permit passage of a crewmember. The radius of such a docking ring may be substantially perturbed by the thermal environment and a fluid coupling positioned on the docking ring periphery may be required to mate to its counterpart half in the presence of a substantial offset between the mating axes of each coupling half. One solution to permit successful mating of the fluid coupling is to provide ample time for the temperatures between the two modules to stabilize, equalizing the thermal distortions and bringing the coupling axes into alignment. Such an operational constraint is often detrimental to the mission timeline and prevents other essential mission operations.

Therefore, there is a need for a Fluid Transfer Coupling for communication of a variety of media between space-borne assets that features provisions for successful mating and de-mating under misaligned conditions and, further, to be compatible with automatically-driven and blind mating.

SUMMARY OF THE INVENTION

One aspect of the present invention provides a fluid transfer coupling (FTC) for transferring one or more fluids between assets, such as spacecraft, satellites, platforms, robotic arms, refueling tools, space stations, etc. The FTC has an Active Side and a Passive Side. The Active Side is mounted on a first asset; and the Passive Side is mounted on a second asset. Once coupled together, the FTC allows for transfer of one or more fluids between the assets. The fluid transfer may occur in either direction, from the first asset to the second asset or from the second asset to the first asset. The FTC provides a common design architecture for different fluids accommodating a variety of flow rates and pressure drops depending upon the particular fluid. The basic wetted component design of the FTC involves a rigid, centrally-disposed nozzle on the Passive Side which contacts and opens a poppet valve on the Active Side as the two sides are coupled; and a rigid annular nozzle on the Active Side, coaxially located with but occupying a different radius than the Passive Side nozzle, which contacts and opens a corresponding contamination cover on the Passive Side.

Another aspect of the present invention provides an Active Side of the FTC. The Active Side contains an alignment cone, a nozzle, a poppet valve, and a fluid conduit attached to and in fluid communication with the poppet valve. The alignment cone is configured to guide and to align the Active Side with the Passive Side during coupling mating. The poppet valve contains a poppet rod located inside a housing. The poppet rod is biased forwardly to retain the poppet valve into a closed position. When the poppet rod is pushed rearwardly, the poppet valve is opened. The geometry of the poppet valve and the interior of the Active Side nozzle is provisioned to promote the maximum mass flow rate of media, and is additionally selected to be compatible with bi-directional flow. The geometry is furthermore selected to be insensitive to sudden surges or drops in fluid pressure, or other transient fluid behaviors. The Active Side is pivotably mounted into a spherical ball joint which provides rotational degrees of freedom about any three coordinate system axes. The Active Side features an array of centering springs which act to maintain the Active Side, in its rotational mounting, in a substantially aligned orientation wherein the longitudinal axis is parallel to the mating line-of-action. Those skilled in the art will recognize that the rotational degrees of freedom may similarly be afforded by a gimbal mechanism, flexure array, or other means commonly used.

A further aspect of the present invention provides a Passive Side of the FTC. The Passive Side contains a passive nozzle fixed within a passive housing, and a Passive Side fluid conduit connected to the passive housing and in fluid communication therewith. The passive nozzle is configured to push on the poppet rod on the Active Side to open the active poppet valve when the coupling sides are mated. Coaxially located outboard of the passive nozzle and inboard of the passive housing is a contamination cover which serves both as a poppet to seal the Passive Side in the de-mated configuration as well as to protect the main seals, which are situated in tandem arrangement within the passive housing and which serve to provide the primary seal against fluid egress between mated Active and Passive Sides. The Active Side nozzle is configured to engage and push against the passive contamination cover, retracting the cover and exposing the main seals to engage the outer circumference of the active nozzle, during mating.

An additional aspect of the present invention provides for a locking mechanism which rigidly restrains the Active and Passive Sides from separating after they are mated, the engagement of which is actuated by the mating sequence, and the release of which is enabled by the de-mating sequence; this mechanism containing a plurality of locking pawls pivotably mounted in a radial pattern about the circumference of the active cone, the pawls equipped with a roller which engages with and whose motion is directed by the surface profile of an external locking collar, and which when urged radially inward by motion of said collar, penetrate into the interior volume of the active cone to interface with a corresponding radially-provisioned array of detent cuts in the passive housing, thereby locking the passive housing to the active cone in order to arrest separation of the Active and Passive Sides when pressure forces are introduced to the mated coupling set.

A yet further aspect of the present invention provides an asset, preferably a space asset, having one or more Active or Passive Sides of the FTC attached thereon. The one or more Active or Passive Sides are configured to couple with one or more Passive or Active Sides, respectively, on another asset.

Methods for making and using the different aspects of the present invention are also provided.

Other aspects of the invention, including apparatus, devices, kits, processes, and the like which constitute part of the invention, will become more apparent upon review of the following detailed description of the exemplary embodiments.

BRIEF DESCRIPTION OF THE DRAWINGS

The foregoing background and summary, as well as the following detailed description of the drawings, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. Other components and configurations may be used without parting from the spirit and scope of the disclosure. In the drawings.

DETAILED DESCRIPTION

Figure 1:
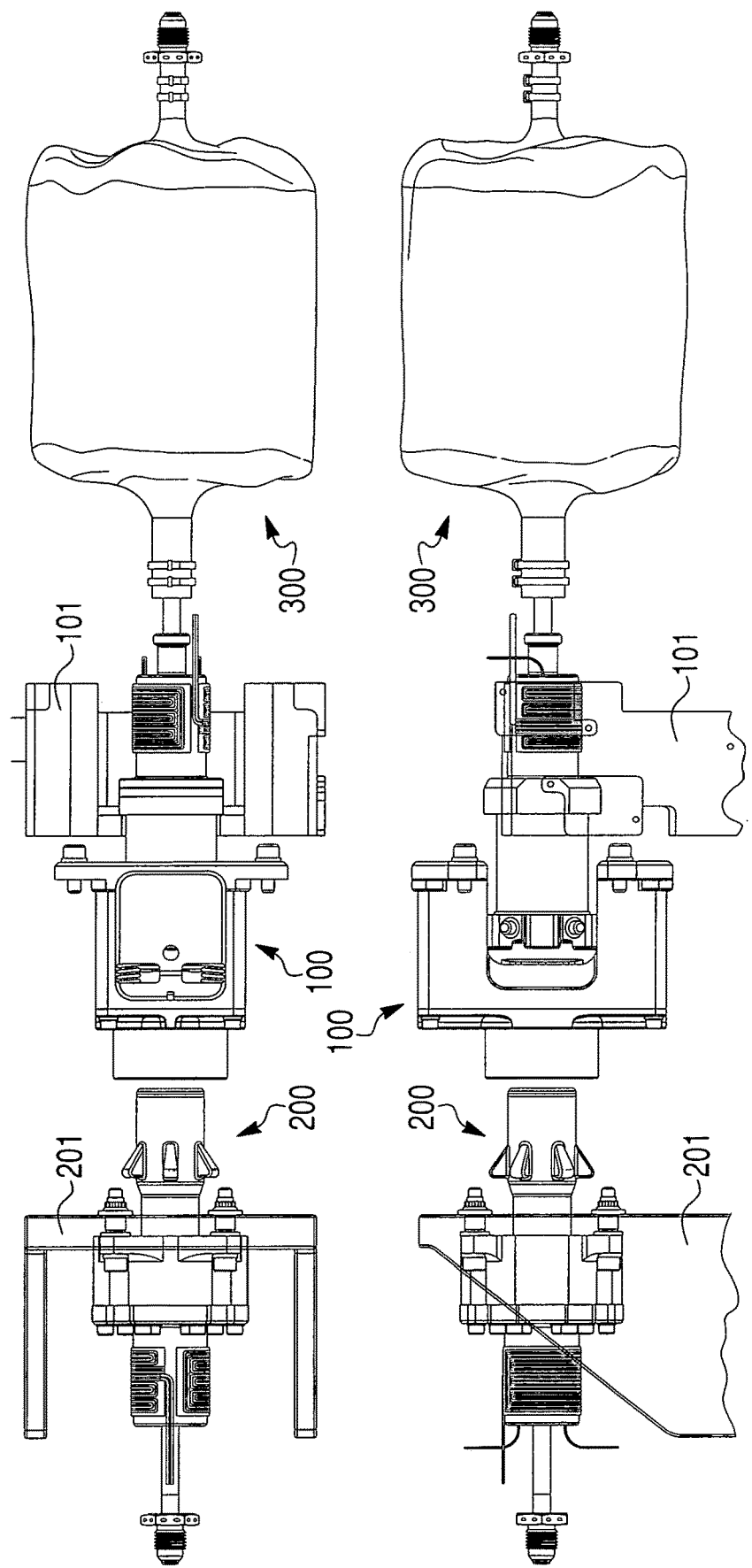
FIG. 1 is a side and top view of a preferred embodiment of the Fluid Transfer Coupling (FTC), illustrating both the Active Side and Passive Side in the ready-to-mate configuration

The exemplary embodiment(s) of the present invention will now be described with the reference to accompanying drawings. The following description of the preferred embodiment(s) is merely exemplary in nature and is in no way intended to limit the invention, its application, or uses.

For purposes of the following description, certain terminology is used in the following description for convenience only and is not limiting. The characterizations of various components and orientations described herein as being "front," "rear," "back," "vertical," "horizontal," "upright," "right," "left," "side," "top," "bottom," or the like designate directions in the drawings to which reference is made and are relative characterizations only based upon the particular position or orientation of a given component as illustrated. These terms shall not be regarded as limiting the invention. The terminology includes the words above specifically mentioned, derivatives thereof and words of similar import.

Figure 2:
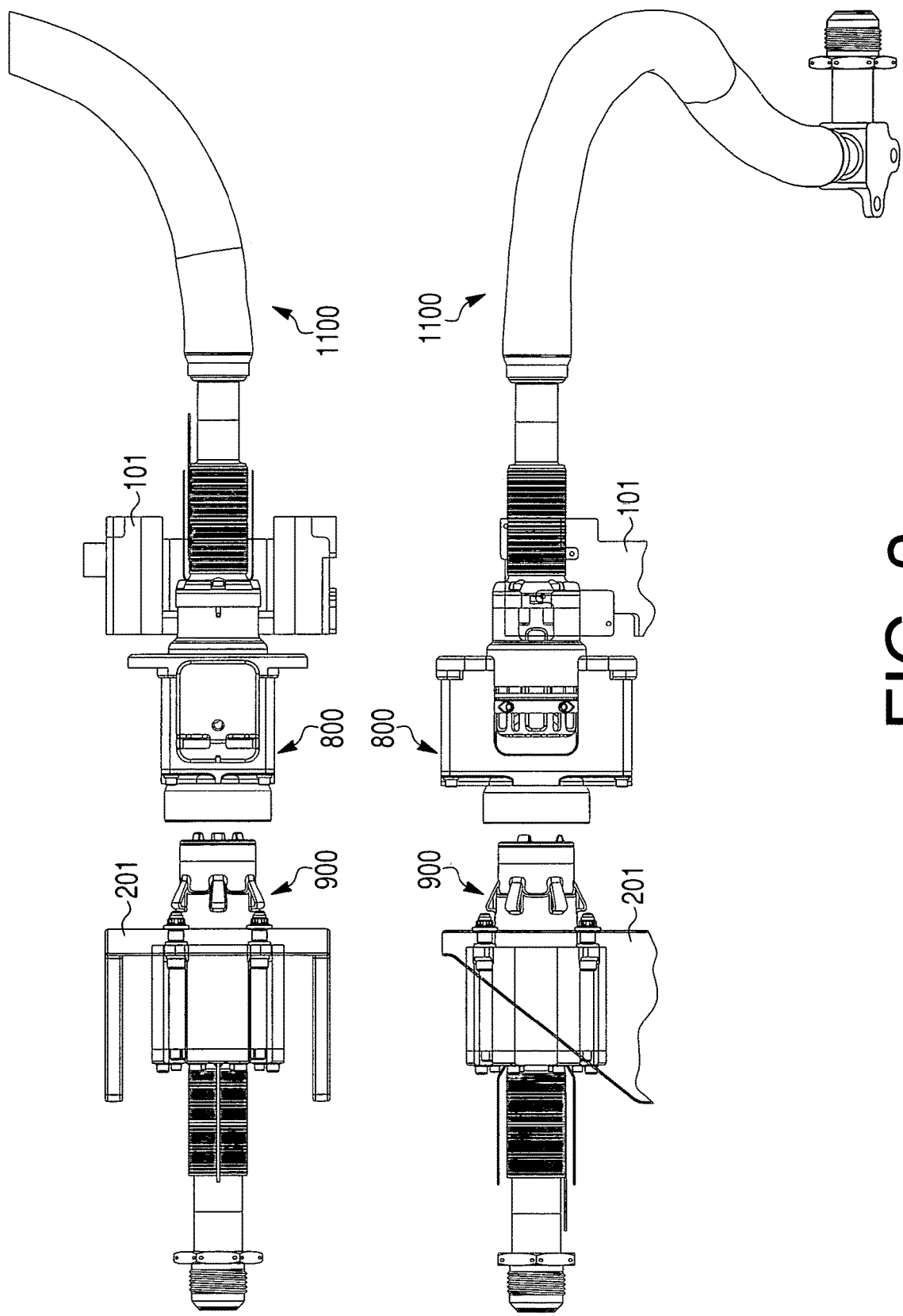
FIG. 2 is a side and top view of an alternate preferred embodiment of the Fluid Transfer Coupling (FTC), illustrating both the Active Side and Passive Side in the ready-to-mate configuration.
Figure 3:
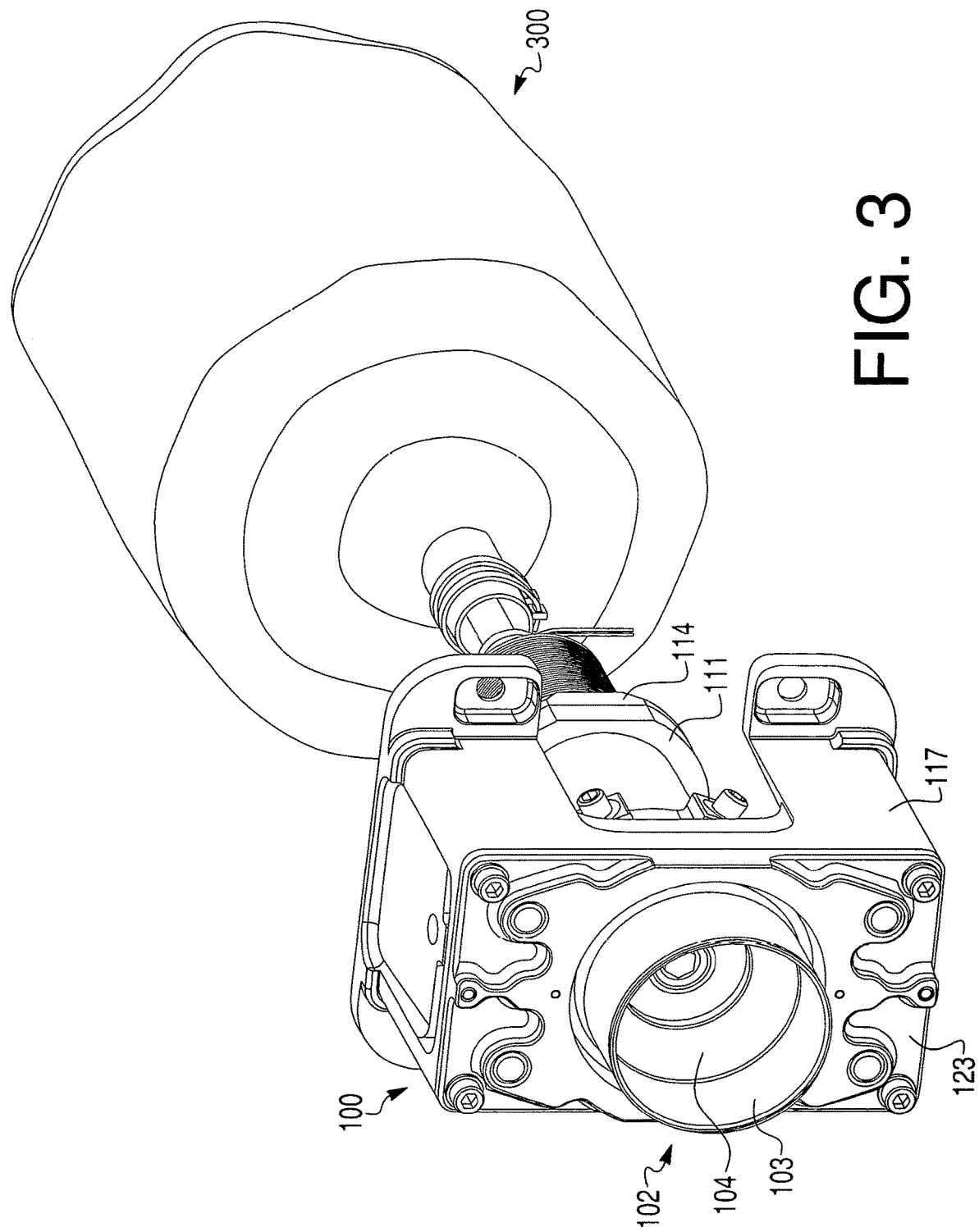
FIG. 3 is a perspective view of the preferred embodiment of the Active Side of the FTC illustrated in FIG. 1.

The invention relates to a Fluid Transfer Coupling (FTC) for transferring one or more fluids between assets, such as spacecraft. Referring to FIGS. 1-2, the FTC contains an Active Side 100 and a Passive Side 200. The Active Side 100 is preferably mounted on a first asset by an extendable umbilical actuator 101; and the Passive Side 200 is preferably mounted on a second asset by a fixed mounting bracket 201. The first and second assets may be satellites, spacecraft, orbiting platforms, habitable stations, logistics modules, planet-finding observatories, vehicle refueling depots, robotic arms, tools, or combinations thereof. Once two sides are coupled together, the FTC allows for transfer of one or more fluids between the assets. Preferably, the fluid transfer may occur in both directions, from the first asset to the second asset and from the second asset to the first asset. The fluid may be, but is not limited to, propellant (monopropellant, fuel, oxidizer, gaseous propellant), pressurant gases, coolant, cryogens, etc. The FTC provides a common design architecture for different fluids, and accommodates a variety of flow rates and pressure drops depending upon the particular fluid. The basic wetted component design of the FTC involves a rigid, centrally-disposed nozzle on the Passive Side which contacts and opens a poppet valve on the Active Side as the two sides are coupled; and a rigid annular nozzle on the Active Side, coaxially located with but occupying a different radius than the Passive Side nozzle, which contacts and opens a corresponding contamination cover on the Passive Side. The FTC provides one or more of the following features: 1) sealing components on the active and Passive Side are independently opened by a rigid feature on the opposing coupling, eliminating spring-balancing concerns characteristic of fluid coupling embodiments in which one poppet acts on the opposing poppet in order to release both poppets from their seats, and enabling bi-directional flow, since transient pressure disturbances or pressure reversal cannot force the poppets on either the Active Side or Passive Side to close or chatter; 2) all springs are fully redundant and independently fail-safe: coaxially stacked springs feature left/right coiling to prevent coil bind, and at maximum compression, all springs feature coil spacing greater than the spring wire diameter; therefore even a failed spring would not be able to thread into itself and cause jamming or inability for the mechanism to reach its fully compressed state; 3) in a preferred embodiment, a lock mechanism localizes the pressure-induced coupling separation forces; 4) the design is readily serviceable even when welded into the host asset's plumbing system, as all seals and springs can be accessed and replaced without disturbing the welded interface at the rear of each side; 5) each side of the FTC is equipped with integral resistance heaters and resistive thermal sensors in order to condition the wetted volume to a favorable fluid temperature; and 6) the alignment features are designed such that the mating sequence is fully scoop-proof, wherein no seal and/or valve can be engaged prior to the Active and Passive Sides achieving proper alignment; this important feature of this disclosure ensures that the seal engagement always occurs in a repeatable orientation, aligned coaxially with the seals, which is essential for seal life and performance, especially with gaseous media such as Xenon and Helium.

Figure 4:
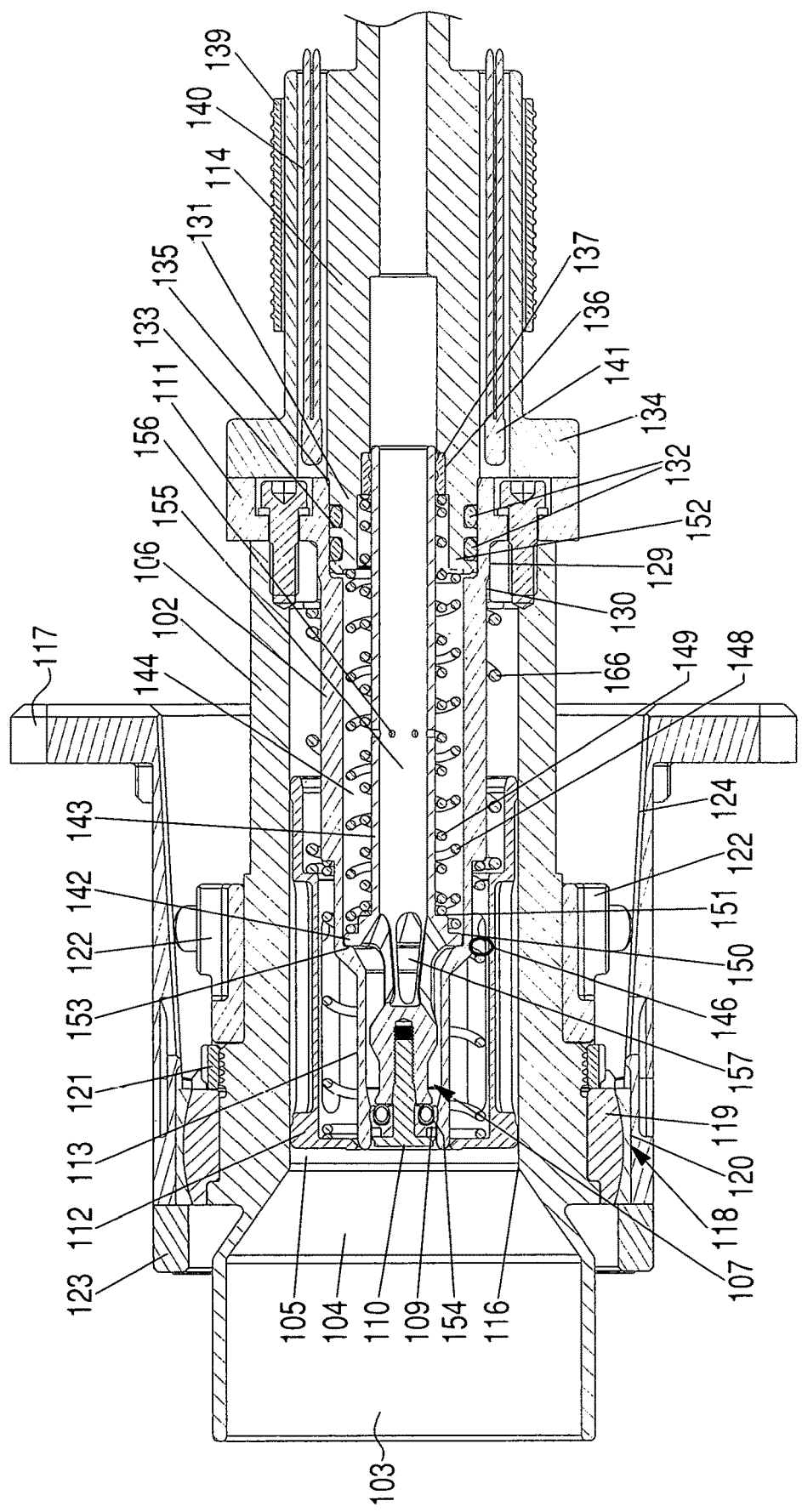
FIG. 4 is a cutaway perspective view of a preferred embodiment of the Active Side.
Figure 5:
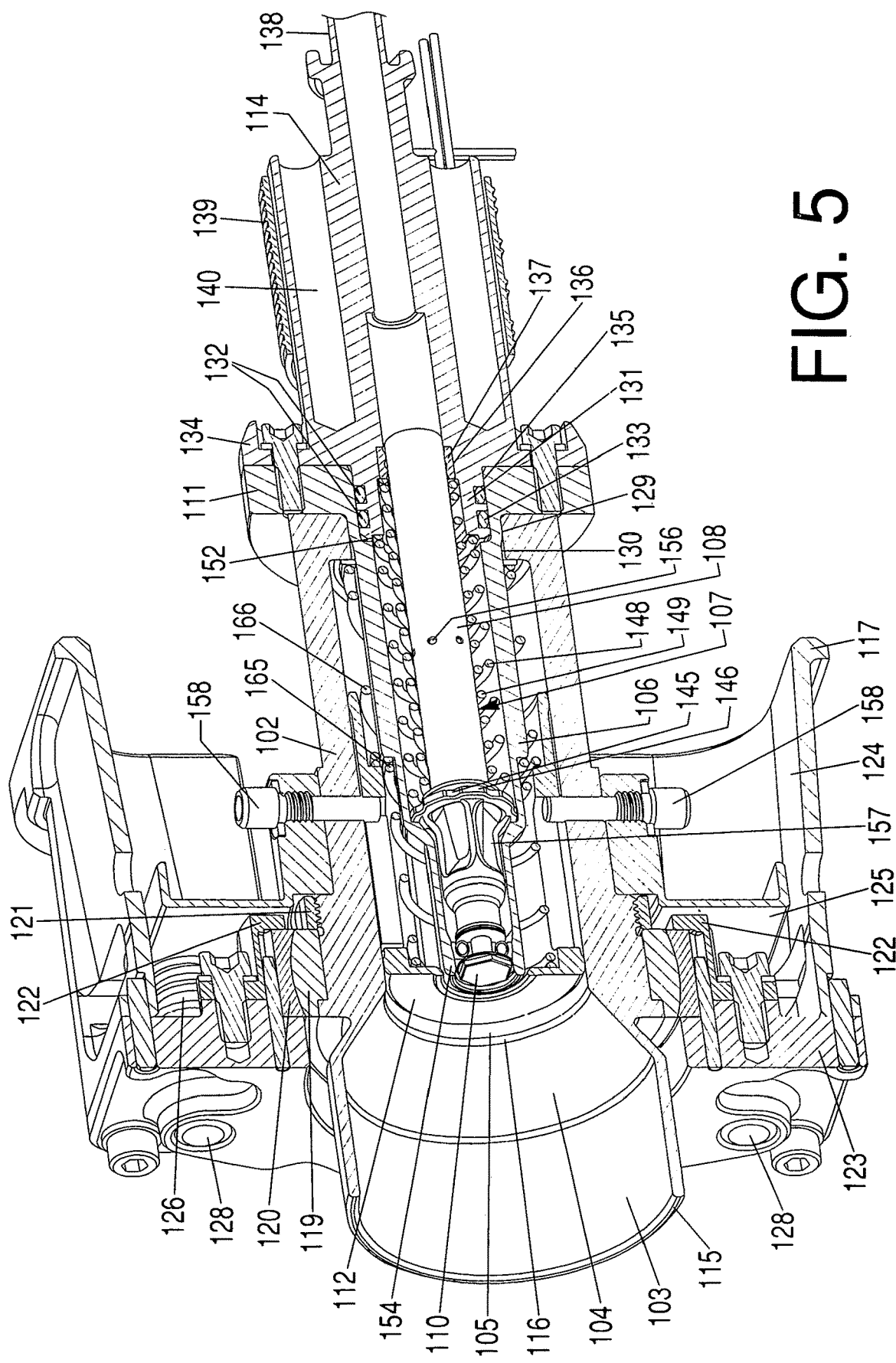
FIG. 5 is a cutaway side view of the Active Side embodiment illustrated in FIG. 4.
Figure 6:
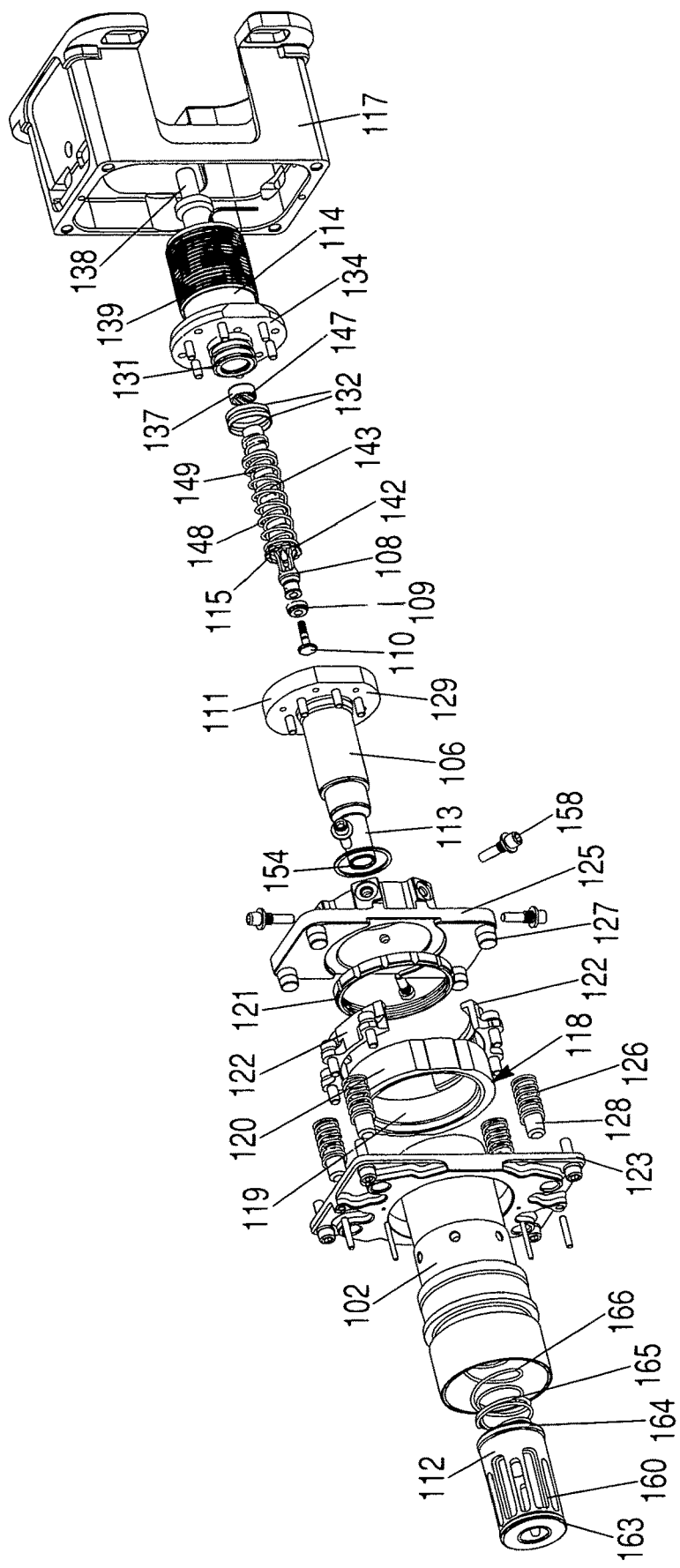
FIG. 6 is an exploded assembly view of the Active Side embodiment illustrated in FIGS. 3-5.

Referring to FIGS. 3-7, the Active Side 100, from front to rear, includes an alignment cone 102, the cone including a mouth 103, a conical taper 104, and a throat 105; a poppet valve assembly 107, the assembly including a poppet rod 108, a spring-energized poppet seal 109, and a seal retainer 110; a nozzle 106 which attaches to and resides coaxially within the cone 102 by means of an attachment flange 111; a contamination cover 112 which protects the sealing surface 113 of the nozzle 106 when the Active Side is not mated; and a rear housing 114 (see FIG. 3) attached to and in fluid communication with the nozzle 106. The cone 102 is configured to guide and to align the Active Side 100 with the Passive Side 200 during engagement of the two sides 100 and 200 of the FTC. The cone 102 is a substantially cylindrical tube containing an enlarged mouth 103, the mouth being coaxial with the longitudinal axis of the FTC and extending into the cone 102 a specific distance which is essential to ensuring alignment with the Passive Side prior to seal engagement, and featuring an edge radius 115 which is also essential to the alignment phase of mating; a tapered conical section 104 which interfaces with the Passive Side housing and whose angle, surface finish and surface coating are selected to minimize the umbilical actuator force required to effect alignment between Active and Passive Sides, and which transitions to a throat 105 via a radius 116, the throat 105 being coaxial with the mouth 103 and whose relationship in size to the mouth 103 is selected to minimize the umbilical actuator force required to effect alignment between Active and Passive Sides. The cone 102 is disposed within a mounting bracket 117, preferably on a spherical ball joint 118, containing an inner race 119 which is secured to the cone 102 via a locknut 121 and an outer race 120 which is configured to reside within a recess integral to the bracket 117 (FIG. 4). The outer race 120 is secured within the bracket 117 via symmetric retainers 122 affixed to a retainer plate 123, the retainer plate 123 being secured to the bracket 117 and forming the forward closeout to the bracket 117. In this way, the outer race 120 is anchored to structure which moves commensurately with the umbilical actuator, and the inner race 119 suspends the Active Side pivotably within bracket 117. The arrangement permits the Active Side to spin about its axis and simultaneously wobble about any axis orthogonal to the longitudinal centerline. The bracket 117 is configured with an internal taper 124 which interfaces with a wobble plate 125. The wobble plate 125 is configured with, for example, adjustable abutments which may be positioned to contact the interior tapered surface of the bracket 117 after a predetermined amount of swing of the Active Side about the ball joint 118. In this way, the wobble plate 125 limits the rotational displacement of the Active Side relative to the bracket 117 and the umbilical actuator. In a preferred embodiment of the invention, the abutments are selected to limit clocking (rotation about the main longitudinal axis) to ±3° and to limit wobble (rotation orthogonal to the main longitudinal axis) to ±2.5°, although other travel limits are readily realized and fall within the scope of this disclosure.

In a preferred embodiment of the invention, the wobble plate 125 and retainer plate 123 are configured to receive a plurality of springs 126 which are positioned substantially at the corners of the wobble plate 125 and located at their ends via guide pins 127 and 128 received with a press-fit within wobble plate 125 and retainer plate 123, respectively. As the retainer plate 123 is attached to the bracket 117 and the wobble plate is attached to the cone 102, the springs 126 bridge the rotatable interface between cone 102 and bracket 117. The arrangement of springs is configured in such a way that when the cone 102 is rotationally displaced with respect to the bracket 117, an increase in preload is observed in the spring or springs residing in the direction of rotation, whereas a decrease in preload is observed in the spring or springs outside the direction of rotation; in this way, a restoring moment develops about the center of the ball joint 118 which acts to re-center the cone 102 within the bracket 117 when the misalignment or disturbing force is removed.

Those skilled in the art will readily envision additional techniques and methods for imparting a restoring moment to the pivotably-suspended components of the Active Side, such as flexures, garter springs, marcel expanders, etc., and such techniques fall within the scope of this disclosure.

The preceding description of the ball joint 118 and its mounting provisions to impart a rotational degree of freedom to the Active Side in a preferred embodiment should not be construed to limit the scope or application of other rotatable mounting provisions, as those skilled in the art can readily envision a gimbal or flexure array which resides internally within the bracket 117 and which suspends the cone 102 therein, and these means of pivotable mounting are considered alternate embodiments of the invention and applicable within the scope of this disclosure.

The nozzle 106 is configured to be received coaxially within the cone 102 and contains the aforementioned poppet assembly 107 having the poppet 108, poppet seal 109, and seal retainer 110. Nozzle 106 includes a piloting boss 129 which executes a slip to tapping fit within a corresponding pilot bore 130 located at the rear of cone 102. In this way, concentricity between cone 102 and nozzle 106 is assured. Nozzle 106 abuts the rear surface of cone 102 via a mounting flange 111 immediately aft of piloting boss 129 and adjacent thereto. In a preferred embodiment, a plurality of fasteners arranged in a radially symmetric pattern about the Active Side longitudinal axis attaches the flange 111 to the cone 102.

Fastened to the nozzle 106 in a similar fashion is the rear housing 114. The rear housing 114 is configured to provide a front projection 131 which includes provisions for two 0-rings 132. The projection 131 and O-rings 132 are received within a tightly-configured counterbore 133 at the rear of the nozzle 106 and concentricity between the nozzle 106 and rear housing 114 is established in the same manner employed between the nozzle 106 and cone 102. The rear housing 114 features a flange 134 which attaches to flange 111 of nozzle 106 via a separate plurality of fasteners which are configured to engage the nozzle flange 111 between the fasteners which connect flange 111 to cone 102. Those skilled in the art will readily envision alternate methods for fastening cone 102, nozzle 106 and rear housing 114 which include direct threading, collar nuts, jam nuts, etc. and such methods are considered within the scope of this disclosure. The counterbore 133 features a tapered lead-in 135 to compress the O-rings 132 as they are installed to the nozzle 106 and prevent damage. O-rings 132 comprise a redundant seal against leakage from the wetted volume shared by nozzle 106 and rear housing 114. A counterbore 136 is provided just aft of the projection 131 to receive a bushing 137 which coaxially locates the poppet rod 108. The distal end of the rear housing 114 is configured to provide a tube stub 138 which serves as the interface to a deformable or flexible fluid line assembly, the flexible fluid element providing the fixed interface to the space asset's fluid system via any number of methods known to those skilled in the art, such as orbital welding, compression fittings, 37° flared fittings, etc. Ahead of the tube stub 138 on the exterior of the rear housing 114 is a pattern of resistive electrical heaters 139; in the preferred embodiment these are Kapton strip heaters affixed to the exterior of the rear housing 114 via adhesive and over-taped with a metal foil tape. Two heaters are provided for redundant thermal control of the Active Side wetted volume. To provide for temperature knowledge in a closed-loop thermal control system, the rear housing 114 is provisioned with an array of tubular cavities 140 in close proximity to, but not in direct communication with, the wetted fluid volume of the rear housing 114. Cavities 140 provide for mounting of redundant resistive thermal devices (RTDs) 141 to issue temperature feedback to the space asset's thermal control system.

In a preferred embodiment, the poppet rod 108 is coaxially received within the nozzle 106 and the rear housing 114 by a flange 142 and a shank 143, the flange 142 piloted with a precision fit along the interior bore 144 of the nozzle 106 and the shank piloted with a precision fit through the bushing 137 located within the rear housing 114. By guiding the axial motion of the poppet rod 108 on the flange 142 and shank 143, the maximum support wheelbase is established which provides for a high length-to-diameter ratio in order to guarantee smooth, non-binding motion of the poppet assembly 107. Furthermore, by constraining the poppet rod 108 by means of the flange 142 and shank 143, the poppet seal 109 is absolved from participating in guidance of the poppet rod 108 motion. This characteristic is essential to ensure uniform, concentric loading of the seal 109 as it engages its sealing surfaces and facilitates long seal life. To further promote smooth motion of the poppet assembly 107 as it is exercised between its open and closed positions, the flange 142 is configured with scalloped cuts 145 and radiused edges 146 to reduce the surface area in contact with the interior bore 144 of nozzle 106 and to more readily tolerate particulate debris in the motion path. Similarly, the bushing 137 is configured with helical flutes 147 which provide a means to clear and tolerate particulate debris that may exist on the poppet rod 108 shank 143.

The poppet assembly 107 is configured to reside in the normally closed configuration by means of redundant springs 148 and 149. The forward ends of springs 148 and 149 are seated against coaxial abutment surfaces 150 and 151 of poppet rod 108 flange 142. The aft end of spring 148 seats against an abutment surface 152 provided within projection 131 of rear housing 114; the aft end of spring 134 seats against the forward edge of bushing 137 and spring preload maintains the position of the bushing within its counterbore in the rear housing 114. The springs are configured to provide a preload which urges the poppet assembly 107 forward, toward the mouth 103 of cone 102. Forward motion of the poppet assembly is arrested by an abutment interface between the poppet rod 108 flange 142 and a corresponding shoulder 153 internal to the nozzle 106. The location of flange 142 and shoulder 153 are mutually selected so as to position seal 109 in preloaded communication with the interior sealing surface 154 of nozzle 106. In this way, the natural position of the poppet assembly 107 within the nozzle 106 serves to close off the interior volume of the nozzle 106 and prevent ingress of contamination into said volume. In this closed position, the mutual geometries of the forward end of the nozzle 106 and the seal retainer 110 are selected to shield the polymeric material of the seal 109 from direct line-of-sight of exterior particle radiation, for example Van Allen particles, solar energetic particles, solar wind, and galactic cosmic rays.

The poppet rod 108 is provided with an internal cavity 155 through which transferred fluid flows to/from the interior of the rear housing 114 and the tube stub 138. The internal cavity 155 is in fluid communication with the main bore 144 of nozzle 106 by means of a radial pattern of pressure equalization ports 156 which allow fluid to pass from the interior poppet rod cavity 155 through the shank 143. The equalization ports 156 ensure that, during fluid transfer, there are no significant pressure differentials between zones of flow and zones of stagnation within the wetted volume of the Active Side. The poppet rod 108 is additionally provisioned to communicate fluid between the cavity 155 and the forward exterior annular region around the seal 109 via a plurality of radially disposed elongated slots 157, the slots configured with ends whose surfaces form a predetermined angle to the centerline of the poppet rod 108. The slot 157 end entry and departure angles, and the length of the slots, have been selected through analysis and test to maximize the mass flow rate in the annular region around the seal 109 as well as to minimize the pressure drop in this region, while simultaneously minimizing features that act to trip the flow into turbulence.

The springs 148 and 149 are configured to pilot over their entire length in order to avoid buckling and intertwining of coils which would jam the opening stroke of the poppet assembly 107. Spring 149 is piloted along the shank 143 of poppet rod 108, whereas spring 148 is piloted along the bore 144 of nozzle 106. The bore and shank piloting features are selected, and spring sizes are selected, such that each spring is constrained to its piloting surface and the exterior diameter of spring 149 cannot make physical contact with the internal diameter of spring 148. Furthermore, the size and length of each spring is configured in such a way that when the poppet rod 108 is translated aft within the nozzle 106 to its fully open position, the space between coils of each spring remains greater than the spring's wire diameter, which ensures that failure of a spring resulting in total coil fracture, and subsequent winding together of the failed coil sections, cannot cause the spring to jam at a length greater than that required for full stroke of the poppet rod 108. In this way, the disclosed invention provides a poppet assembly 107 which is fault-tolerant against the inability to close, due to physical redundancy of springs, as well as being fault-tolerant against the inability to open, due to the anti-jamming coil geometry provided.

Figure 7:
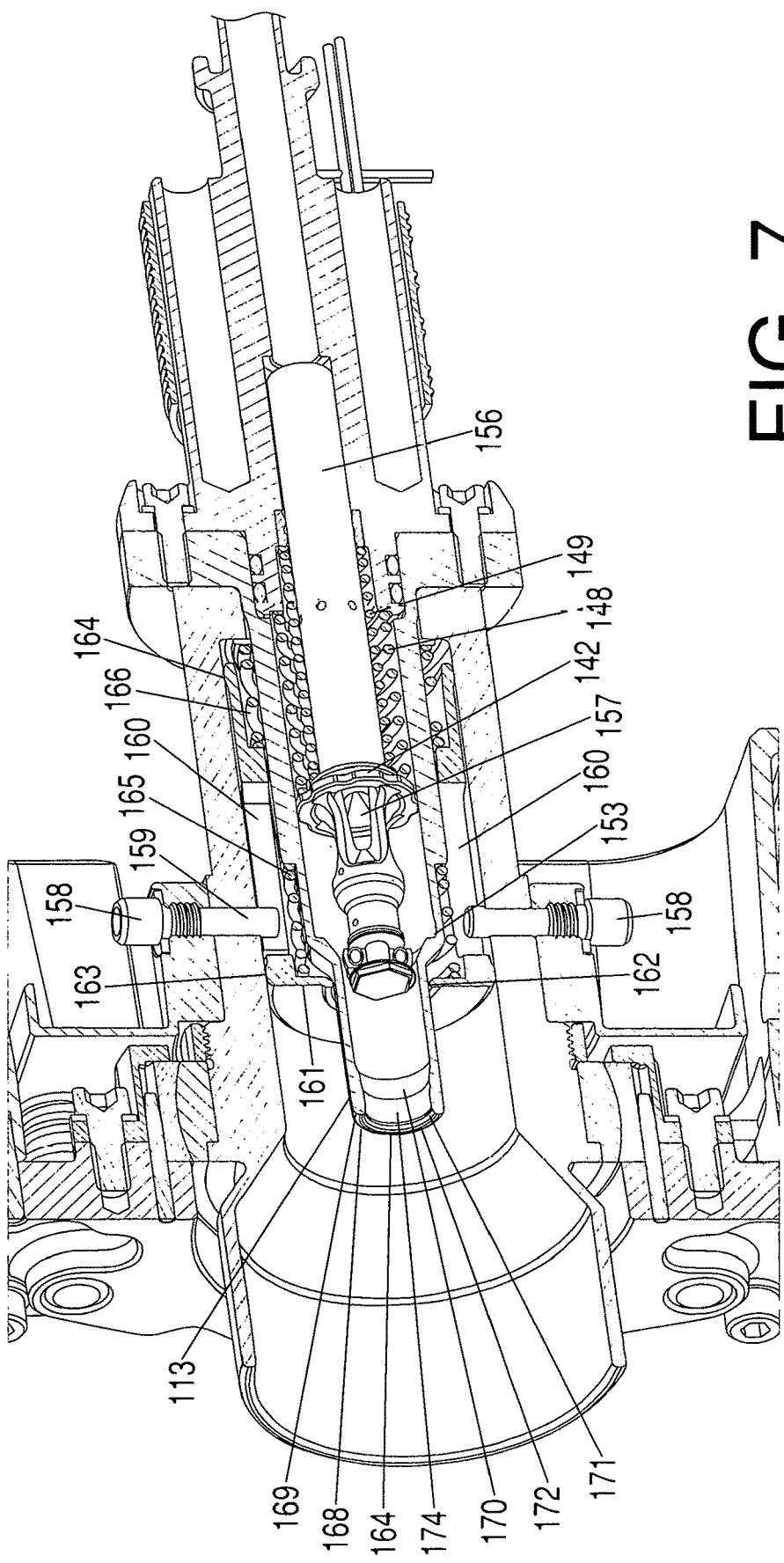
FIG. 7 is an enlarged view of the front end of the Active Side when the poppet rod and contamination cover are fully retracted.

Referring now to FIG. 7, the forward portion of the Active Side is illustrated in close-up with poppet assembly 107 and contamination cover 112 shown in a configuration corresponding to full mated engagement with the Passive Side. The contamination cover 112 is received inside the cone throat 105 and is attached thereto by a plurality of guide pins 158 whose axes lie along radially oriented directions and intersect at a point which lies upon the Active Side longitudinal axis. The guide pins 158 are further configured to be attached to the wobble plate 125 via a threaded interface, such that the guide pins 158 extend through the wobble plate 125 in a direction toward the Active Side center. The guide pins 158 are received by tight-fitting holes oriented radially around the circumference of the cone 102, and passing through the cone 102, such that a projection of each guide pin 159 extends into the throat 105 and is received by a corresponding pattern of longitudinally oriented slots 160 provided on the contamination cover 112. In this way, the contamination cover is constrained to move along the Active Side longitudinal axis within prescribed limits. Simultaneously, the wobble plate 125 is affixed to the cone 102 via the same array of guide pins. The contamination cover 112 is configured such that in its relaxed state, its forward face lies substantially flush with the front face of the active nozzle 106. An annular projection 161 extends radially inwardly from the main body of the contamination cover 112 and its interior diameter 162 comes within close proximity to, but not touching, the sealing surface 113 of nozzle 106, forming an impediment to debris and contaminant ingress into the space between the contamination cover 112 and sealing surface 113. The fit between the guidance features 163 and 164 on the outer diameter of contamination cover 112 and the cone throat 105 is selected such that in the presence of worst-case manufacturing tolerances and thermally-induced distortions, projection 161 will never physically contact surface 113, ensuring no metal-to-metal sliding which could introduce scratches into the sealing surface 113. The contamination cover external diameter is configured with two annular projections 163 and 164 at each end, and these projections are furnished with a crown radius in order to prevent any edge contact with the throat 105 of the cone 102 as the contamination cover 112 slides axially. By positioning projections 163 and 164 at the ends of the contamination cover 112, the maximum wheelbase for contact between the contamination cover 112 and throat 105 is assured, minimizing any proclivity to cocking and sticking during the sliding motion of the contamination cover 112. Additionally, the contamination cover 112 external diameter may be configured with helical flutes which provide a means to clear and tolerate particulate debris that may exist within the throat 105.

The contamination cover 112 is urged forward in its unactuated state, against the forward travel limit imposed by the interface between guide pins 158 and slots 160, by springs 165 and 166. As with the poppet springs 148 and 149, the contamination cover springs 165 and 166 are configured to be fully piloted along their length, selected such that sufficient preload in each spring exists to bias and hold the contamination cover 112 in its correct relaxed position should one spring fail, and selected such that the size and length of each spring is configured in such a way that when the contamination cover 112 is translated aft within the cone 102 to its fully open position, the space between coils of each spring remains greater than the spring's wire diameter, which ensures that failure of a spring resulting in total coil fracture, and subsequent winding together of the failed coil sections, cannot cause the spring to jam at a length greater than that required for full stroke of the contamination cover 112. In this way, the disclosed invention provides a contamination cover 112 that is fault-tolerant against the inability to close, due to physical redundancy of springs, as well as being fault-tolerant against the inability to open, due to the anti-jamming coil geometry provided.

Also illustrated in FIG. 7 are the unique features which comprise the sealing geometry of the active nozzle 106. Sealing surface 113 is cylindrical in form and receives the main seals and when mated to the Passive Side. In order to facilitate engagement of the main seals and over the active nozzle 106, the forward end of the nozzle 106 is provided with a distal radius, which transitions to a tapered conical surface 168, which in turn transitions to the sealing surface 113 via a second radius 169. The radii and cone angles are selected to be compatible with the design of the main seals and as well as to provide sufficient margin of installation of the main seals and over the sealing surface 113 to accommodate assembly error, dimensional tolerances, and positional uncertainty of the umbilical actuator which lead to variability in the total amount of penetration of the nozzle 106 into the seals and when the Active Side and Passive Side are mated.

Similarly, the interior of the nozzle 106 is provided with features that promote guidance and alignment of the active poppet seal 109 as the poppet assembly 107 is returned to its relaxed position. An internal conical surface 170 transitions to the internal sealing surface 154 which receives poppet seal 109 and closes off the interior volume of the nozzle 106 when the Active Side is de-mated. The shoulder 142 on the poppet rod 108, and its corresponding abutment 153 within the nozzle 106 are selected such that the poppet seal 109 is restricted from sliding forward of the sealing surface 154 and onto the conical surface 171, which is provided as a lead-in for entry of the passive seal retainer 219.

Figure 8:
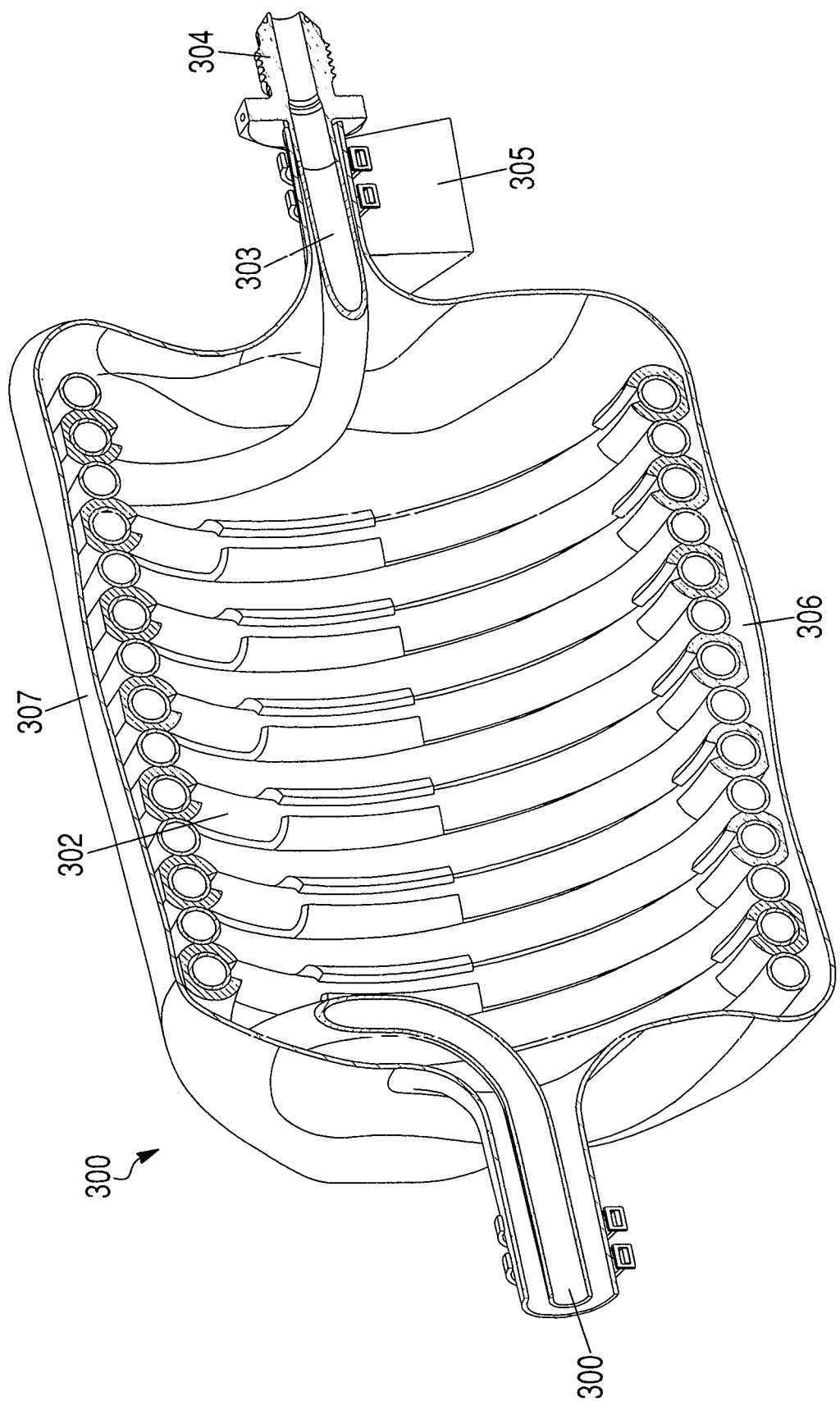
FIG. 8 is a cutaway perspective view of the deformable coiled tube assembly illustrated in FIG. 1.

Referring to FIG. 8, in a preferred embodiment of the invention, the deformable coiled tube assembly 300 is the means by which the tube stub 138 connects to the space asset's propulsion system. The coiled tube assembly 300 is provided with a forward stub 301 which interfaces to the active tube stub 138 by, for example, an orbital weld, a coiled section 302 comprising a length of tubing bent into a coil shape, a rear stub 303 which is attached to a rear fitting 304, the fitting 304 serving as a primary fluid interface to the space asset. Alternatively, rear stub 303 is configured with sufficient length that fitting 304 may be removed and rear stub 303 directly welded into the space asset's propulsion system.

The rear stub 303 and fitting 304 are configured to be fixed to the hosting space asset via a fixing means 305, such as structural clamp, mounting bracket, or the like. Simultaneously, the rear stub and/or the fixing means 305 provide a means to attach a roughly cylindrical thermal control basket 306 which remains fixed at location 305 but which is configured with an open mouth at the forward end to allow for motion of the coils 302 relative to the basket 306 as the Active Side is driven forward during mating to the Passive Side. The basket 306 provides accommodations for a plurality of heaters arranged radially around the circumference of the coils 302 and configured to occupy the majority of the length of the coil array. In the preferred embodiment these are Kapton strip heaters affixed to the exterior of the thermal control basket 306 via adhesive and over-taped with a metal foil tape. Four or more heaters are provided for redundant thermal control of the Active Side wetted volume. To provide for temperature knowledge in a closed-loop thermal control system, the thermal control cage 306 may be configured to provide for mounting of redundant resistive thermal devices (RTDs) to issue temperature feedback to the space asset's thermal control system. Around the exterior of the coil array 302 and thermal control cage 306 is fitted a thermal blanket 307 to insulate the interior coil volume; in a preferred embodiment this blanket includes multiple layers of Mylar or Kapton alternating with layers of a separating mesh, most commonly comprised of Dacron, all of which is retained by an outer protective layer of fiberglass cloth or Ortho fabric. The blanket 307 is secured at its ends to tube stubs 301 and 303 and is configured with sufficient extra length to allow for internal expansion of the coil 302 as the Active Side is driven forward, away from the fixed location 305.

Figure 9:
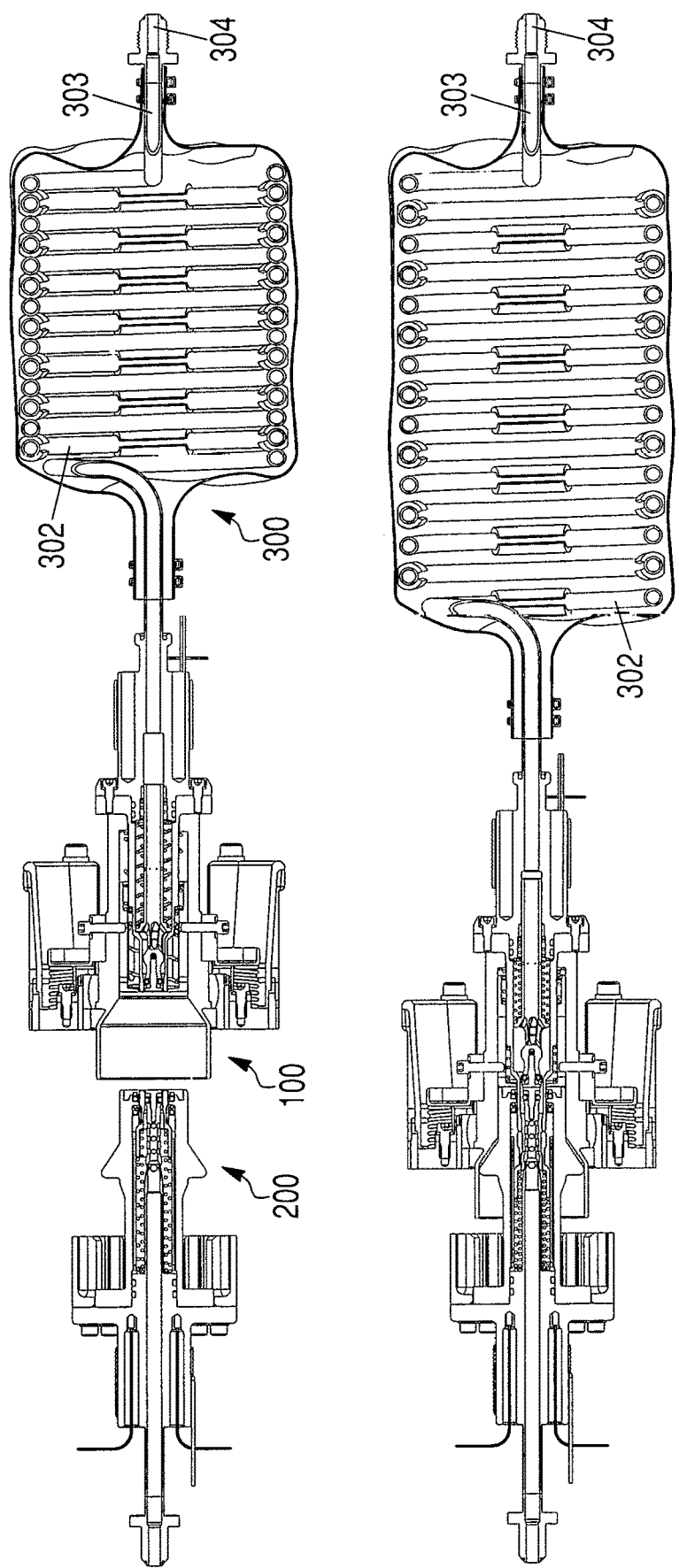
FIG. 9 is a cutaway side view of the preferred embodiment of FIG. 1 shown in the de-mated and mated configurations, illustrating the operation of the deformable coiled tube assay of FIG. 8.

Referring to FIG. 9, a comparison is illustrated between the Active Side in its de-mated position and its mated position, showing the expansion of the coil array 302 while the rear stub 303 and fitting 304 remain fixed to the hosting space asset. The radius and number of coils 302 are selected to minimize the induced stress within the coil array 302 as well as to minimize the total force that is exerted on the Active Side by extension or compression of the coil array 302. In a preferred embodiment, the geometry of the coil 302 is configured such that when the Active Side is extended to its mated position, the coil 302 is in a relaxed state, exerting little to no force on the system; when the Active Side is configured at its de-mated position, for example during launch and ascent to orbit, the coil 302 is compressed and a residual stress and preload are present. This compressed preload can be exploited to augment the stiffness of the system under the launch and ascent vibration environment.

In an alternate preferred embodiment of the invention, a flexible hose assembly is the means by which the tube stub connects to the space asset's propulsion system. The flex hose assembly is provided with a forward stub which interfaces to the active tube stub by, for example, an orbital weld; a flexible section; a rear stub which is attached to a rear fitting, the fitting serving as a primary fluid interface to the space asset.

One embodiment of the flexible section includes at its core a conventional stainless steel thin-walled convoluted hose, comprised of a pattern of either annular or helical convolutions, and manufactured by means commonly known in the art, e.g. hydroforming or continuous welding. The convoluted hose is welded to its end stubs and by conventional means. The hose is fitted with one or more overbraid sleeves which are tubular assemblies of woven stainless steel wire, and which are also welded at their ends to stubs and the overbraid serves to protect the hose assembly by controlling the shape and relieving the convolute-to-fitting welds from bearing loads when the hose is pressurized. Outside of the overbraid at each end of the flexible section are strain relief springs and, sometimes referred to as anti-kink guards. Wrapped around the stubs and, overbraid, and strain relief springs and are one or more spiral thin film heaters, one end of which is fixed at the forward stub and the opposite end, including wire leads, terminating near rear stub. To provide for temperature knowledge of the wetted volume within the hose assembly, provisions on spiral heater are made for mounting of one or more resistive thermal devices whose wire leads are configured to exit in close proximity to the heater leads. Around the exterior of the hose assembly is fitted a thermal blanket to insulate the interior hose volume. In a preferred embodiment this blanket includes multiple layers of Mylar or Kapton alternating with layers of a separating mesh, most commonly comprised of Dacron, all of which is retained by an outer protective layer of fiberglass cloth or Ortho fabric. The blanket is secured at its ends to tube stubs and.

End fitting is equipped with a tube section of sufficient length that fitting may be removed and tube section directly welded into the space asset's propulsion system. End fitting may also feature a manifold section which may feature, for example, distinct mounting provisions to the host space asset and accommodations for a resistive thermal device to provide feedback on fluid temperature at the FTC-to-host asset interface. Those skilled in the art will recognize that fitting may be furnished in any number or geometries and angular orientations in order to orient the flex hose rear stub in accordance with the mounting requirements of the host space asset.

The passive Side includes a substantially cylindrical front passive housing and a rear passive housing. The front and rear passive housings and are connected to each other at their respective flanges and by one or more mechanical fasteners, such as bolts/screws/nuts. The rear housing is attached to a mounting bracket via a similar pattern of fasteners arranged radially around the central axis of the Passive Side. The rear housing includes at its aft distal end a tube stub to which is attached a rear fitting, the fitting serving as a primary fluid interface to the space asset. Alternatively, stub is configured with sufficient length that fitting may be removed and stub 204 directly welded into the space asset's propulsion system.

The front passive housing is configured to guide and align the Passive Side to the Active Side during engagement of the two sides of the FTC. Specifically, the front passive housing incorporates features which, when brought into engagement with their corresponding features on the active cone, induce forces and moments about the ball joint assembly which cause the Active Side to rotate and translate in such a way as to establish a mutually coaxial relationship between the Active Side and Passive Side. These Passive Side alignment features includes a nose, a cylindrical neck, and a plurality of tapered alignment vanes arranged in a radially-symmetric pattern around neck. In a preferred embodiment of the invention, six to twelve alignment vanes are provided; other arrangements of vanes, and a single tapered ring which replaces the vanes, fulfill the same purpose and are considered within the scope of this disclosure.

The nose is an annular lip featuring a crown radius and whose outer diameter is slightly larger than the outer diameter of the neck. The outer diameter of the nose is additionally sized to be slightly less than the internal diameter of the cone throat. The alignment vanes feature a tapered face which may be straight or of a curved profile, the face transitioning to an apex radius. The locus of apex radii form a circle whose axis is coincident with the Passive Side longitudinal axis and whose diameter is slightly less than the cone mouth. The positional relationship of the nose and vanes—specifically the distance along the Passive Side longitudinal axis from the crown radius to the apex radii—is selected to be compatible with the separation between the active cone throat and mouth such that when Active Side and Passive Side are brought into engagement, the passive nose fits within the cone throat and the passive vanes fit within the cone mouth.

The distal end of the rear housing is configured to provide a tube stub which serves as the interface to the space asset's fluid system via any number of methods known to those skilled in the art, such as orbital welding, compression fittings, 37° flared fittings, etc. Ahead of the tube stub on the exterior of the rear housing is a pattern of resistive electrical heaters; in the preferred embodiment these are Kapton strip heaters affixed to the exterior of the rear housing via adhesive and over-taped with a metal foil tape. Two heaters are provided for redundant thermal control of the Passive Side wetted volume. To provide for temperature knowledge in a closed-loop thermal control system, the rear housing is provisioned with an array of tubular cavities in close proximity to, but not in direct communication with, the wetted fluid volume of the rear housing. Cavities provide for mounting of redundant resistive thermal devices (RTDs) to issue temperature feedback to the space asset's thermal control system.

Integral to the rear housing is a passive nozzle which projects from the mounting flange and which configured to be received coaxially within the front housing. The Nozzle provides a cavity which is in direct fluid communication with the stub and fitting. Along the forward portion of the nozzle are provided an array of multiple rows of radial passages, circular in shape in a preferred embodiment but not required to be circular, which permit passage of the fluid from the interior cavity to the annular space between the nozzle and the interior of the passive housing. From that space, fluid is available to be exchanged with the Active Side. Affixed to the forward distal end of the nozzle is an internal seal and seal retainer. Ahead of the radial passages are one or more smaller passages which extend from the circumference of the nozzle into a threaded chamber which receives the seal retainer; these passages provide a path to evacuate entrapped air or fluid. Immediately aft of nozzle, the rear housing is configured to provide a piloting boss which executes a slip to tapping fit within a corresponding pilot bore located at the rear of front housing. In this way, concentricity between the front housing and nozzle, as well as rear housing, is assured. The piloting boss includes provisions for two 0-rings, and pilot bore is configured to simultaneously receive the O-rings. The pilot bore features a tapered lead-in to compress the O-rings as they are installed to the front housing and prevent damage. O-rings comprise a redundant seal against leakage from the wetted volume shared by front housing and rear housing. The rear housing abuts the rear surface of front housing via a mounting flange immediately aft of piloting boss and adjacent thereto. In a preferred embodiment, a plurality of fasteners arranged in a radially symmetric pattern about the Passive Side longitudinal axis attaches the flange to a corresponding flange of front housing. Those skilled in the art will readily envision alternate methods for fastening front housing and rear housing which include direct threading, collar nuts, jam nuts, etc. and such methods are considered within the scope of this disclosure.

The forward end of front housing is configured to receive two spring-energized main seals and in a coaxial tandem arrangement, separated by partition. The forward main seal is configured to be installed from the forward end of the front housing and secured in place by a retainer, the retainer interface to the front housing comprising a thread and shoulder. The seal is supported on its outer diameter partially by a front housing surface and partially by a retainer surface. Surfaces and are configured such that surface fully contacts the sealing lip of seal; in this way, retainer does not participate in the sealing function and serves only to capture the seal. Retainer provides a plurality of counterbores on its forward face which are configured to receive a spanner wrench or other appropriate tool for tightening the retainer to the front housing. The rear main seal is configured to be installed from the rear end of the front housing, the front housing featuring a main bore immediately ahead of piloting bore. The main bore is sized to be slightly larger than the free outside diameter of the seal. A gradual taper is provided to gently transition from the main bore to the rear seal gland. In this way, the external lip of seal is not wiped or exercised during installation until just prior to engaging the gland. The rear main seal is retained against the front housing partition via a backing ring which is in turn located within the front housing main bore via a spacer. The forward end of the spacer abuts a shoulder at the rear of the backing ring and the rear end of the spacer abuts the front face of rear housing piloting boss; the distance between the front of the piloting boss and the rear main seal is substantially occupied by the backing ring and spacer, but the spacer is configured to be slightly short in order to allow for shims to be installed between its rear abutment and the piloting boss; in this way, clearance or preload against seal may be adjusted at assembly. Situated on the circumference of the spacer are a plurality of radially-symmetric slots, the slots providing a means for fluid to contact the main bore of front housing and establishing a more efficient conductive and radiative thermal path between the fluid and front housing in order to promote rapid temperature equalization and minimize thermal gradients between the front housing 201 and the fluid carried therein.

The Passive Side is configured to provide an annular volume between inboard wetted components (nozzle, internal seal and seal retainer) and outboard wetted components (spacer, backing ring, seal, seal, housing and retainer). Furthermore, seals and are configured to be positioned coaxially and approximately at the same axial location along the main longitudinal axis of the Passive Side. A contamination cover is coaxially received within the described annular volume by an annular projection and an outer lip, the projection piloted with a precision fit along the outer diameter of the nozzle and the lip piloted with a precision fit along the interior bore of the spacer. By guiding the axial motion of the contamination cover on the projection and lip, the maximum support wheelbase is established which provides for a high length-to-diameter ratio in order to guarantee smooth, non-binding motion of the contamination cover and minimize any proclivity to cocking and sticking during the sliding motion. Additionally, the contamination cover bearing surfaces may be configured with helical flutes which provide a means to clear and tolerate particulate debris that may exist on the nozzle or spacer.

The contamination cover is configured to reside in the normally closed configuration by means of redundant springs. The forward ends of springs are seated against coaxial abutment surfaces of the contamination cover. The aft ends of springs abut against the forward surface of the rear housing pilot boss. The springs are configured to provide a preload which urges the springs forward, toward the retainer. Forward motion of the poppet assembly is arrested by an abutment interface between the contamination cover and backing ring. The locations of abutment surfaces are mutually selected so as to position seals in simultaneous preloaded communication with the interior sealing surfaces, respectively, of contamination cover. In this way, the natural position of the contamination cover serves to close off the interior volume of the passive housing and prevent ingress of contamination into said volume. In this closed position, the mutual geometries of the forward end of the nozzle and the seal retainer are selected to shield the polymeric material of the seal from direct line-of-sight of exterior particle radiation, for example Van Allen particles, solar energetic particles, solar wind, and galactic cosmic rays. In a similar fashion, the geometry of the retainer is selected to shield the main seal.

The internal cavity which houses springs is in fluid communication with the main bore of the rear housing by means of a radial pattern of pressure equalization ports which allow fluid to pass into the cavity from the nozzle. The equalization ports ensure that, during fluid transfer, there are no significant pressure differentials between zones of flow and zones of stagnation within the wetted volume of the Passive Side.

The springs are configured to pilot over their entire length in order to avoid buckling and intertwining of coils which would jam the opening stroke of the contamination cover. Spring is piloted along the shank of the nozzle, whereas spring is piloted along the bore of spacer. The bore and shank piloting features are selected, and spring sizes are selected, such that each spring is constrained to its piloting surface and the exterior diameter of spring cannot make physical contact with the internal diameter of spring. Furthermore, the size and length of each spring is configured in such a way that when the contamination cover is translated aft to its fully open position, the space between coils of each spring remains greater than the spring's wire diameter, which ensures that failure of a spring resulting in total coil fracture, and subsequent winding together of the failed coil sections, cannot cause the spring to jam at a length greater than that required for full stroke of the contamination cover. In this way, the disclosed invention provides a contamination cover which is fault-tolerant against the inability to close, due to physical redundancy of springs, as well as being fault-tolerant against the inability to open, due to the anti-jamming coil geometry provided.

The contamination cover is provided with features that promote guidance and alignment of the main seals and the nozzle seal as the contamination cover is exercised between its relaxed and open positions. Regarding the nozzle seal, an internal conical surface transitions to the internal sealing surface which receives seal. The abutment interface surfaces are selected such that the contamination cover is restricted from sliding forward of the seal. The previously described annular projection which guides the contamination cover over the nozzle is selected to be smaller than the diameter of the sealing surface. This prevents sealing surface from contacting any component other than the seal during its motion along the nozzle. The nozzle piloting diameter is interrupted by circumferential cavities which are substantially longitudinal in layout and which are separated in such a way as to form ribs, coincident with the nozzle outer diameter. The contamination cover projection guides along these ribs during translation, the guiding surface area thereby minimized. In addition, the cavities provide a pathway for fluid to travel from the radial ports, under the projection, and out into the annular region between the seals (or vice-versa in the opposite flow direction) Likewise, regarding the main seals, an external conical surface transitions to the external sealing surface which, when the contamination cover is closing to its relaxed position, moves fully into and out of engagement with seal, sweeping past the seal lip and engaging seal. In order to minimize seal wear, seal is not engaged with contamination cover when the contamination cover is closed; a conical departure surface is provided aft of the sealing surface which relieves contact between contamination cover and seal; the conical shape of the departure surface, however, aids in alignment and engagement with seal as the contamination cover is depressed during mating of the Passive Side to the Active Side and the sealing surface sweeps by seal during opening of the contamination cover. The outer guiding lip, piloted with a precision fit along the interior bore of the spacer, works in cooperation with the annular projection piloted upon the ribs of the nozzle in order to guide the contamination cover while maintaining a permanent clearance between sealing surfaces any surrounding metallic structure. In this way, sealing surfaces and cannot come into contact with any Passive Side element except for their respective seals, ensuring that the surfaces are protected from scratching during the entire stroke of the contamination cover.

The Active and Passive Sides of the FTC in their fully coupled position to allow fluid transfer between the two sides. The FTC allows fluid to flow in either direction, from the Passive Side to the Active Side or vice versa. As the Active Side is carried toward the Passive Side by the umbilical actuator, the cone is fed over the passive housing. Namely, the alignment features on the Passive Side include the nose, crown radius, vanes, vane angled surfaces and vane apex radii; the alignment features on the Active Side include the cone mouth, conical surface and throat. These features act in mutual cooperation between Active Side and Passive Side to bring the central longitudinal axes of each side into collinear arrangement; this aligned axis pair does not necessarily need to be coincident with the thrust axis of the umbilical actuator. Note also that no sealing surfaces or wetted components are in contact during, or participate in, the alignment portion of mating. Only after alignment has been completed does the Passive Side penetrate the Active Side sufficiently to begin engagement of wetted components. To establish the fluid connection, seal retainer engages and pushes upon seal retainer, which causes poppet assembly to retract into the active nozzle against springs. Simultaneously, the forward edge of nozzle contacts the forward edge of contamination cover, causing the contamination cover to retract into the passive housing against springs. This retraction clears a volume for the active nozzle to enter the passive housing and engage the main seals. At the same time, the passive retainer engages the active contamination cover, causing it to retract against springs as the active nozzle penetrates the Passive Side, and the passive nozzle penetrates the active nozzle. When this condition has been achieved, the wetted volumes between Active Side and Passive Side have achieved fluid communication and flow may be initiated. As an example, flowing from Passive to Active Sides, fluid enters the passive rear housing through fitting; travels down the rear housing bore to the passive nozzle; radially ejects from the nozzle via the ports, the first three rows of ports serving to supply fluid to the Active Side while the fourth row of ports supplies fluid to balance pressure in the chamber retaining the contamination cover springs; travels under the contamination cover projection via longitudinal cavities, where it enters the interior of the active nozzle; travels over the passive internal seal, passive seal retainer, active seal retainer, active poppet seal, and around the poppet rod; passing through the poppet rod slots and into the interior bore; passing through the interior of the rear housing and the tube stub into either the deformable coiled tube or flexible hose. During transfer, seals and are not active and are bypassed by fluid; the exterior leak path between the Active and Passive Sides and is closed by main seals and engaged against sealing surface of active nozzle. O-rings and statically seal the wetted components of the Active and Passive Sides to their respective housings and provide redundant leak resistance within each Side, relative to itself. In this way, only two seals, establish the coupled system external leak inhibit, which provides full redundancy while maximizing reliability—no more seals than are required to establish redundancy are employed, and these are the only external leak seals that witness relative engagement with a component on the opposing side, minimizing the features whose coaxiality needs to be tightly controlled between sides.

The time sequence for the coupling of the active and Passive Sides in a condition where the coupling sides are significantly misaligned with respect to one another. Typically, the Passive Side is stationary, while the Active Side is driven toward the Passive Side, e.g., by an umbilical actuator. As the Active Side approaches the Passive Side, the two sides need not be perfectly aligned. A certain alignment tolerance is allowable by virtue of the design of the two sides. In a preferred embodiment of the invention, the axis of the Passive Side may be offset in a direction extending radially from the axis of the Active Side by approximately 0.2", the radial offset being in any direction relative to the Active Side axis. The Active and Passive Side axes may additionally be simultaneously skewed, in any orientation, approximately 2.5° while also being clocked relative to one another (rotation about the main axis) approximately 3°. The features of the Active Side and Passive Side disclosed herein work to correct these simultaneous radial, skew, and clocking offsets as the couplings are brought together during mating.

Depending on the combination of misalignments, contact between the Active Side and Passive Side may first occur at the passive nose to active conical portion interface; or at the passive vane taper surface to active cone mouth edge radius interface. The Active to Passive contact induces a moment about the active ball joint assembly which causes the ball joint inner race to displace rotationally from the outer race, against the preload of the wobble centering springs. The Active Side will continue to rotationally displace about the ball joint as long as contact is maintained with either the nose or vane taper of the Passive Side. During this phase contact will be exchanged between the vane taper to cone mouth and nose to conical portion interfaces. Continued rotation of the Active Side about the ball joint will inevitably cause the axis of the Active Side to become parallel to, and then swing past the location of parallelism and continue until the Active Side reaches its rotational hard stop. At this point, unable to rotate further, the component of contact force due to passive nose to active conical portion which is normal to the thrust axis of the umbilical actuator mandates that the Active Side must translate laterally, in a direction radial from the thrust axis of the umbilical actuator, in order to allow entry of the passive nose into the active throat. In the illustrated embodiment, this lateral compliance is provided by the umbilical mechanism but may also be incorporated into the Active Side in alternate embodiments of the invention. After sufficient lateral translation has occurred, the passive nose may begin to enter the active throat; at this time, the Passive Side and Active Side axes are still not parallel; the crown radius on the nose of the passive housing provides a relief zone just behind the nose in order to prevent the passive housing from jamming in the active throat as it begins to insert at a skewed angle. Almost immediately after entry of the nose into the throat, the tapered portion of one or more passive vanes comes into contact with the mouth radius of the active cone. This contact induces a momentary counter-moment in the Active Side which causes the Active Side to "kick up" in order to bring its main axis into coincidence with the main axis of the Passive Side. In this way, the Passive Side provides two distinct alignment zones, nose and vanes, separated by a sufficient wheelbase so as to introduce the appropriate correcting moment to the Active Side in order to rotate it into alignment with the Passive Side. Those skilled in the art will recognize that maximizing the length of this nose-to-vane wheelbase minimizes the contact forces, and therefore the burden on the umbilical actuator, during alignment. Those skilled in the art will also recognize that reducing the angle of the active conical portion has the effect of reducing the component of contact force that must be overcome by the actuator during the initial rotation phase and lateral alignment phase of the motion of the Active Side.

Sufficient distance remains between the various wetted components of both the Active Side and Passive Side to permit the vane apexes to enter the cone mouth and translate a short distance, while the passive nose concurrently continues into the cone throat. During this period of engagement, both the passive nose and vane apex array are coaxially positioned with respect to the active throat and mouth, respectively. The centers of each contact ring, then, establish coaxiality between the Active Side and Passive Side, and, most importantly, establish said coaxiality before bringing the various valves, contamination covers, and seals into contact. In this way, the disclosed invention completely separates the act of alignment from the act of retracting contamination covers, opening poppet valves, and engaging seals. The end result is that the main sealing surface of active nozzle 106 cannot engage passive main seals in any condition other than full coaxial alignment, and furthermore, the tolerances and clearances selected for the various peripheral components ensure that no feature other than the passive main seals can make physical contact with surface, ensuring the integrity of the sealing surface under multiple mate/demate cycles.

The mated Active and Passive Sides at the moment of engagement of wetted components. Nose is shown inserted into cone throat; vane apexes are shown inserted into cone mouth; passive retainer is in contact with active contamination cover; passive contamination cover is in contact with active nozzle; and passive seal retainer is in contact with active poppet seal retainer. Also illustrated is that although the main axes of the Active and Passive Sides and are co-aligned, the axis pair is skewed with respect to the umbilical actuator thrust axis. Continued advancement of the umbilical actuator to feed the active nozzle into the Passive Side will therefore result in a commensurate additional lateral/radial motion of the Active Side with respect to the thrust axis. During this phase of mating, the passive retainer pushes against the active contamination cover, causing it to retract against its biasing springs and reveal the sealing surface of the active nozzle; active nozzle pushes against the passive contamination cover, causing it to retract into the passive housing and reveal the main seals, which are subsequently engaged by the nozzle; and passive seal retainer pushes against poppet seal retainer, causing the active poppet assembly to retract against its biasing springs into the interior of the nozzle, allowing entry of the passive nozzle into the interior of the active nozzle to establish the fluid transfer path.

In one preferred embodiment, there are no shoulders or abutments which restrict further penetration of the Passive Side into the Active Side after sufficient fluid communication and seal engagement has been established. Rather, the umbilical actuator controls the final relative engagement of the two sides, and the lack of engagement stops provides margin against overstroke of the actuator due to control uncertainty and tolerance buildup. Similarly, the main seals engage over the active nozzle with sufficient margin to permit understroke of the actuator.

In an alternate preferred embodiment in which the Active Side is configured to provide a locking mechanism to rigidly restrain the active and Passive Sides together after the two sides are fully coupled. The locking mechanism prevents the tendency of the Active and Passive Sides to attempt to disengage when subjected to a separation force induced by pressure of the fluid media contained therein. The locking mechanism additionally, because it localizes the separation reaction force between the Active and Passive Sides, absolves the umbilical actuator from bearing any pressure-induced separation forces, which reduces the design and performance burden on the umbilical actuator. The locking mechanism and its constituent parts are configured to reside within the volume defined by the retainer plate and mounting bracket, thereby allowing an FTC to be furnished in a locking or non-locking version with no change to the interface to the space asset.

The locking mechanism replaces the direct interface between the ball joint inner race and the cone with a locking collar, to which the ball joint inner race is mounted in a similar manner as the non-locking embodiment. The locking collar is substantially cylindrical in shape and configured to be mounted over the outer diameter of a modified cone. It is keyed to the cone via a spline which fixes its orientation rotationally about the main axis but enables sliding motion of relative to the cone in a direction parallel to the main axis. The ball joint inner race is fixed to the forward section of the locking collar and clamped against an abutment via a locknut; the ball joint outer race interfaces to the remainder of the Active Side in the manner previously disclosed. The forward portion of the locking collar encases a plurality of locking pawls, arranged in a radially symmetric pattern about the main axis of cone and configured to reside in corresponding recesses provided within the cone. At the forward end of each locking pawl resides a roller which is pinned to the pawl. Each locking pawl is configured to receive a pivot pin via a bore which aligns with a corresponding bore provided in cone. The pivot bores are configured to be oriented perpendicular to the main cone axis and offset by a prescribed radial distance, such that when the locking pawls are installed to their recesses, they may pivot in a fashion that causes the rollers to move radially toward, or away from, the main cone axis. Each lock pawl is urged to pivot radially away from the central axis by a pair of redundant torsion springs. The pawls pivot in the radially outboard direction until their motion is arrested by an abutment ramp provided on the interior diameter of the locking collar, against which a roller comes to rest. The locking collar provides a plurality of radially arranged ramps co-located with the lock pawl array; each ramp transitions to a flat surface oriented behind the ramp in a direction parallel to the collar main axis. The flat surface terminates at a shoulder that forms the forward edge of a rectangular slot which penetrates radially through the locking collar. The length and width of slot are selected to allow for a set of projections which extend radially outward from the body of each lock pawl and which occupy the space provided by the slots. Slots are located substantially forward on the body of the locking collar and are interspersed in an alternating fashion between a pattern of longer slots which run the majority of the collar length, from the forward locknut thread through the rear threaded section, interrupting thread in a radially symmetric pattern.

The wobble plate is replaced by a spring plate which fastens to the cone in a similar manner as the non-locking version, using pins. In order to permit the locking collar to slide axially between the cone and spring plate, the spring plate is configured to provide an array of radial projections on its inner diameter, the projections being configured to pass through the slots so that their inboard faces may contact the outer diameter of the cone. The pattern of pins is arranged such that each pin passes through the center of each projection and engages a receiving bore arranged in a radially symmetric pattern on the cone. In this way, the spring plate may be fixed to the cone while allowing the locking collar to slide axially between the plate and cone.

Affixed to the aft-facing side of the spring plate are four guide rods over which four springs are piloted. The forward end of the spring abuts against the aft face of the spring plate, while the aft end of the spring abuts against the forward face of a stop plate. When assembled, the distance between the spring plate and stop plate is selected such that the springs are compressed to a relatively heavy preload. The stop plate reacts the preload from springs into a locknut which in turn is fastened to the thread on locking collar. In this way, rearward motion of the stop plate due to spring preload is arrested and the position of stop plate is fixed relative to locking collar. Since the spring preload is also applied to the spring plate, which is in turn fixed to the cone, the spring preload reacted through locknut into the collar urges the collar toward the rear of the cone, where its rearward motion is arrested by abutment against nozzle mounting flange which extends radially outward from the external diameter of the cone to form a shoulder.

Guide rods are configured to provide a coaxial projection which features a smaller diameter than the main body of the guide rod. Projection is sized to fit into a corresponding bore provided by the spring plate, and extends beyond the front face of the spring plate sufficiently to permit a circumferential groove to receive a crescent-shaped projection of a retainer plate, the retainer plate fixed to the forward face of the spring plate and thereby fixing the location of the guide rods relative to the spring plate. In a preferred embodiment of locking mechanism, the guide rods are arranged in a rectangular pattern around the axis of the cone whereby each retainer plate engages two grooves and thus fixes two rods. The guide rods are configured such that they extend rearward, parallel to the main axis of Active Side to engage a corresponding pattern of bores in the stop plate. The bores permit penetration and passage of the guide rods therethrough; each bore is sized and located to avoid an over-constraint in the positioning of its corresponding guide rod as well as being equipped with entry and departure countersinks and adjacent transition radii in order to prevent the bores from acting as bushings as the stop plate moves relative to the rods. In this way, spring preload retains the collar, stop plate and locknut in a rearward-biased position, abutted against the flange of the nozzle.

Umbilical actuator thrusting force is transmitted to the collar and that thrusting force is transmitted to the cone only up to the prescribed amount of spring preload. When the actuator thrust force exceeds the value of spring preload—when, for example, the forward motion of the Active Side encounters an impediment, such as seating of the cone onto the Passive Side—then the collar will continue to move forward, compressing the springs further. Since the guide rods are affixed to the spring plate whose motion is arrested, the rear rod ends are observed to protrude from the rear face of the stop plate as it moves forward, along with the collar, relative to the cone. The forward motion of the collar relative to the cone causes each internal ramp surface to engage its corresponding roller; as the collar is driven forward, the ramp forces the roller to displace radially inward toward the cone main axis in an arc described by the geometry of the lock pawl and centered about the pawl bore. Each roller arcs inwardly, penetrating the interior volume of the cone, the biasing force imparted by springs maintaining contact between the roller and ramp until continued forward motion of the collar pushes the ramps clear of the rollers and the rollers engage the flat surfaces adjacent to the ramp features. At this point, additional forward motion of the collar does not change the relative position of the rollers, and any attempt to separate the rollers by moving them radially outward is resisted by contact with the flat surfaces. In the unlikely event that springs are unable to bias the lock pawl and roller against their corresponding collar features, a relief cut is provided on the lock pawl, to the rear of the pivot bore.

The cut surface is configured to engage against the rear surface of the lock pawl relief cutout at a prescribed amount of lock pawl rotation in the inward direction, preventing the lock pawl and roller from over-penetrating into the interior of the cone and thereby prohibiting entry of the passive housing; the juxtaposition of surfaces is selected such that premature engagement, which would interfere with the minimum amount of lock pawl required rotation to clear the flat surface over the roller, is avoided. The presence of the over-penetration surfaces, as well as the designs of the lock pawls and rollers, and their relationship to the nose of the passive housing, are selected such that in the case of loss of springs and an inwardly-biased roller array, the passive nose is still able to push the rollers out of the way during mating. In this way, the locking mechanism is fail-safe against the inability to fully mate.

The inward constriction of the roller array by action of the locking collar causes the rollers to come into mated engagement with a corresponding pattern of detent features located on the circumference of the passive housing, immediately ahead of the passive vanes. The position of the detents along the length of the Passive Side is selected such that when the rollers engage the detents, sufficient penetration of the active nozzle has taken place to engage the sealing surface against main seals. In order to overcome the preload of the locking spring array initiate the motion of the locking collar relative to the cone as the Active Side is deployed forward against the Passive Side, the forward motion of the cone must be arrested. This is accomplished by bringing the cone forward edge into preloaded rigid contact with an array of hard stop abutments, arranged in a radially symmetric pattern as an integral feature to the passive vanes. The hard stop abutments cause the positional relationship between Active Side and Passive Side to become fixed and repeatable, and the mating of these features preferably occurs well before the end of the umbilical actuator stroke in order that the remainder of said stroke is applied to imparting motion to the locking collar in order to urge the rollers into engagement with the passive housing detents.

In a fully mated and locked configuration, in which the internal flat sections of the locking collar are engaged over the rollers, preventing their withdrawal from detents. When fluid is introduced into the mated coupling pair, the pressure-induced separation force causes the Passive Side to attempt to withdraw the Active Side. This motion is resisted by a force which develops between the rollers and detents. The force contains a component which is parallel to the axis of the coupled FTC and a component normal to the axis. The normal force component is reacted at the interface between the roller and the locking collar flat section, the flat section ensuring that the roller array cannot expand and release its grip on the passive housing. The positions of flat surfaces are selected to reside under the ball joint inner race mounting surface, which is the stiffest portion of the locking collar; this surface is reinforced immediately outboard by the presence of ball joint inner race, which is further reinforced by outer race; in this way, the tendency of the rollers to expand radially outward and release the passive housing is easily resisted by three concentric steel rings. The axial force component of the roller reaction force tends to pull the roller and lock pawl in the direction of disengagement. The pivot bore is configured to be slightly elongated, allowing the lock pawl to execute this motion for a short distance, dictated by a small gap between the front of each roller and the front face of each relief cut in the cone. The roller and lock pawl array therefore shifts very slightly forward, said motion afforded by the elongation of the pivot bores, until the rollers and faces are brought into rigid contact, at which point the axial force component is reacted back into the cone. In this way, the lock pawl pivot pin is completely absolved from bearing any reaction loads induced by pressurization of the system and serves only to provide a swing axle for the pawl. Similarly, the roller pivot pin is absolved from bearing any reaction loads, as the force balance achieves equilibrium at the three interface pairs.

In both the non-locking and locking embodiments of the Active Side, the umbilical actuator thrust force is applied to the ball joint. In the non-locking version, since the inner race of the ball joint is affixed directly to cone, all actuator thrust force is applied directly to the active cone. Alternatively, in the locking version, the ball joint inner race is affixed to the locking collar, and the collar transmits motive force to the cone only through the springs. The spring preload, then, is selected to be greater than any force encountered during mating with the Passive Side in order to avoid premature forward motion of the collar relative to cone and a resulting inadvertent actuation of the locking pawls which would restrict entry of the Passive Side.

The same preload in locking springs which ensures against premature actuation of the locking mechanism also ensures that, during the de-mate stroke of the umbilical actuator, the lock pawls and rollers will always disengage from the passive detents before relative motion between the passive housing and active cone can commence. This is because the preload developed in springs is always reacted at the interface between the cone forward edge and passive hard stops as long as the locking collar is not abutted against flange. Therefore, during the reverse stroke of the actuator, the cone is forced against the Passive Side while the locking collar traverses its full rearward stroke; the mechanism has no valid operational sequence in which withdrawal of the Passive Side can occur before the locking collar has fully retracted. Just as the invention provides a fail-safe means of engaging Active and Passive Sides even in the presence of failed biasing springs, it also provides a fail-safe means of disengaging in the same failed-spring case. Projections on each locking pawl extend radially away from the central axis into the slots of the locking collar and normally do not participate in the action of the locking mechanism. In a failed spring case, the forward face of each slot is configured such that, in the absence of a biasing force which urges the lock pawls and rollers to disengage, the locking pawl projections will engage faces during retraction of the locking collar, forcibly rotating the lock pawls and lifting the rollers out of engagement with passive detents. In this way, the locking action of mechanism is positive-acting in both the engage and disengage sequences. In a further failure case where projections are lost, the departure angles of the passive detents are selected such that, as long as lock pawl motion is not otherwise restricted by the locking collar, pull-out of the passive housing will induce a moment about the pawl pivot bore which will act to naturally rotate the pawls and rollers out of engagement.

Since the locking mechanism requires engagement of radially-patterned features between both Active and Passive Sides, control of the angular clocking of Active and Passive Sides and is important. In two embodiments features may establish precise clocking alignment between sides when starting from a misaligned state of up to and greater than 3°. It should be noted that no such clocking alignment features are required for a non-locking embodiment of the FTC.

The first embodiment of clocking alignment features includes an array of projections which extend longitudinally forward from the passive hard stop faces and are tapered along their extended length. Projections are received, during engagement of the passive housing to active cone, by an array of radial notches interrupting the forward edge of the cone. The notches are shaped with a tapered opening such that the widest portion of the taper occurs at the edge and the notch decreases in width as it extends back along the cone, allowing for a range of relative positioning of each mating projection at the beginning of engagement but urging the projection into a repeatable angular position about the axis of the cone as engagement continues and the notch narrows. The effect is to force the Active Side to rotate about its axis—said rotation afforded by the ball joint—in order to align the notches with projections. The projections 259 and notches are configured such that clocking alignment takes place prior to initiation of motion of the locking mechanism, ensuring that the lock pawls, roller, and passive detents are fully aligned.

In an alternate preferred embodiment of features to control angular clocking between Active and Passive Sides and is provided by a roll-off of the detent feature in passive housing. Rather than featuring a straight cut with a single axis perpendicular to the main axis of the passive housing, detent may be configured to provide surfaces with a central radius which lies in opposition to the main radius of curvature which receives roller. The radius features a center which lies upon the passive housing main longitudinal axis and extends symmetrically from a plane passing through the main axis. At a prescribed arc angle from said imaginary plane, for example, 3°, the radius transitions to a straight surface at its tangent point, surface comprising the straight portion on one side and surface on the opposing side. The angle of the axis passing through surface forms an angle of 3° to a plane normal to the plane passing through passive housing main axis and the center of radius; the same condition exists for surface. The axes of surfaces, then, are additionally skewed by 6° with respect to one another. In this way, the passive housing may enter the active cone with a clocking misalignment up to the detent roll-off angle and the roller pattern will still be able to engage the detent features for locking. As opposed to the projection-and-notch clocking alignment embodiment, which actively rotates the Active Side into a known and repeatable alignment orientation relative to Passive Side prior to engaging rollers, the detent roll-off embodiment permits the Active and Passive Sides and to remain misaligned in clocking orientation and permits the rollers to engage despite that misalignment. In this way, the detent roll-off embodiment eliminates the need for keying notches in the cone and keying projections on the passive housing. Those skilled in the art will recognize that the passive housing may be configured with detent roll-offs of any angle, or even a circumferential groove, in order to render the Passive Side insensitive to misalignment; those and other similar embodiments fall within the scope of this disclosure.

In an alternate preferred embodiment of the invention which enables high flow rates by providing a substantial increase in internal wetted volume yet maintaining the same mounting bracketry, ball joint, and, as applicable, locking mechanism. Such an embodiment is preferable for high-volume propellant transfer or circulation of cooling fluids.

Active Side and Passive Side comprise the locking embodiment of a high-flow FTC, whereby Active Side incorporates locking mechanism. Active Side and Passive Side comprise the non-locking embodiment of a high-flow FTC.

The high-flow locking Active Side in cross-section, perspective section, and exploded view. The figures illustrate that the wetted volume is considerably increased over the Active Side embodiment. Aside from simply increasing the internal diameter of Active Side, Active Side incorporates several specific features designed to increase flow. First, poppet seal retainer features a bullnose projection as opposed to the flat nose of poppet seal retainer, which extends proud of the front end of nozzle. The bullnose feature causes the poppet rod to be pushed back deeper into the interior of nozzle when mated with Passive Side, which permits the retainer, poppet seal, and forward section of poppet rod to be positioned beyond the minimum cross-sectional area of the nozzle internal volume. In this way, the maximum area of flow around the poppet seal is realized. In addition, the poppet rod is configured to provide a plurality of large relief slots arranged in a radially symmetric pattern and passing through the shank area. The slots communicate fluid to a radially symmetric array of axially-oriented passages which are formed integrally to the interior bore of rear housing. The axial passages work in cooperation with slots to divert fluid around the exterior of poppet rod and biasing spring, adding flow capacity to the main flow path which includes the interior bore of poppet rod and rear housing. Further flow improvement is afforded by axially staggering the locations of poppet return springs rather than nesting them within one another; this permits maximization of the interior bore of the poppet rod. Likewise, contamination cover implements axially staggered return springs which minimize the radial thickness of the contamination cover, allowing for the maximum possible diameter of nozzle.

The high-flow locking Passive Side in cross-section, perspective section, and exploded view. The figures illustrate that the wetted volume is considerably increased over the Passive Side embodiment. Aside from simply increasing the internal diameter of Passive Side, Passive Side incorporates several specific features designed to increase flow. First, to maximize the available internal volume of the passive housing, the retainer is configured to incorporate the nose and crown radius geometry, instead of that geometry being part of the housing itself as in Passive Side. This permits the retainer to be fastened to the exterior of the housing, liberating internal volume to be used for fluid. Second, the passive nozzle is configured to be as large as possible by minimizing the section thickness of the contamination cover. Contamination cover features a plurality of forward-facing projections, preferably no more than three, arranged in a radially symmetric pattern about the contamination cover axis. The purpose of these projections is twofold: first, in a similar fashion to the bullnose feature on active poppet seal retainer, the projections cause the contamination cover to hyper-extend into the interior volume of the passive housing when mated to the Active Side, exposing more of the fluid-transferring features of the passive nozzle; second, the boundaries of the projections describe a plurality of void volumes through which fluid is able to flow. When mated to Active Side, the Passive Side is configured to enable fluid flow not only through, and out of, the nozzle, but also over and around the exterior of the retracted contamination cover, passing through the voids into the volume of the active nozzle. In this way, and similar to the features described within the Active Side, Passive Side provides multiple pathways for fluid to flow.

The passive nozzle is configured to provide a necked-down forward portion which is largely relieved by a plurality of radially arranged elongated openings, comprising the primary path for transfer of fluid between the interior volume of the nozzle and the other wetted volumes of both Active and Passive Sides and. When mated to Active Side, the primary fluid exchange path occurs between openings and the interior volume of active nozzle. To facilitate additional flow, when the contamination cover is in the retracted (mated) condition, a plurality of radially arranged slots permits passage of fluid from nozzle openings, through the contamination cover, into a flow relief zone afforded by a co-aligned array of radial slots provided in spacer ring, over the exterior of the contamination cover, through voids and ultimately into the active nozzle.

A passive seal retainer and contamination seal are selected to be smaller than active poppet seal retainer and poppet seal. This configuration has the effect of maximizing the annular flow volume in the minimum cross-section area. Specific attention is given to the selection of geometries—ribs, diameters, radii, chamfers, countersinks—in this zone, as the maximum flow restriction occurs here.

A high-flow non-locking Active Side and high-flow non-locking Passive Side, provides by consuming the volume otherwise occupied by the locking mechanism, even more flow volume can be provided by the invention.

The high-flow embodiments follow the same functional and design architecture as the initially disclosed embodiments; detailed description of components and features is omitted in the high-flow embodiments due to this similarity.

In an alternate preferred embodiment in which the active cone is configured to provide two separate alignment features, which are received independently by the Passive Side. In the formerly disclosed Active/Passive embodiments, alignment occurs as a result of two phases: 1) the passive nose interface to the active conical section induces over-rotational and lateral motion of the Active Side; and 2) the passive vane interface to the active cone mouth induces a kick-up moment which performs final alignment correction prior to seal engagement. The force that must be exerted by the umbilical actuator during the second phase is largely determined by the distance between the passive nose and passive vane apexes and is driven largely by the volumetric constraints of the overall apparatus. The force that must be exerted by the umbilical actuator during the first phase is largely driven by the angle of the active conical section. In the preceding disclosed embodiments, that cone angle is bounded by the respective diameters of the cone mouth and throat as well as the axial length of the mouth which is driven by the required axial stroke to engage the main seals. The dependency of the cone angle on the length of the cone mouth is severed, and the conical surface is permitted to extend all the way to the edge of the mouth.

Cone is substantially similar in form to the preceding active cone embodiments in that it possesses a mouth, conical section, and throat. Affixed to cone is a separate conical insert whose large end is coincident with the front end of the cone, and whose small end is coincident with the start of the throat. When viewed from its end, insert is configured to provide a plurality of relief zones in this example—which are arranged in a radial pattern about the insert axis and which extend through the exterior diameter of the insert, such that in these relief zones access is provided to the original mouth and conical section features.

Passive housing is substantially similar in form to the preceding passive housing embodiments except that the housing has been configured to provide a larger quantity of passive vanes which are thinner, although the location and form of the vane apexes are identical to those previously disclosed. The quantity of vanes matches the quantity of relief zones in the active insert, and the vanes are thin enough that they can pass between the relief zones during mating; furthermore, vanes are sufficiently thin to pass between the relief zones in the presence of a clocking misalignment; in this way, they simultaneously act as keying features and eliminate the need for notching of the active cone (in a locking embodiment).

During the mating sequence, the passive nose engages the shallow conical surface of the insert. The shallow cone angle substantially reduces the axial component of the contact force generated between the insert and passive nose, reducing the effort required by the umbilical actuator to rotate and translate the Active Side during the first phase of alignment. During the second phase of alignment, the passive vanes enter the mouth of cone in a manner identical to the previously disclosed embodiments, passing through the insert relief zones; the relief zones provide access for the vane apexes to interface to the mouth as described earlier in order to generate the kick-up rotation needed to bring Active and Passive Sides into final alignment. In this way, the two phases of alignment between sides occur on separate, independent interfaces and the burden of alignment borne by the umbilical actuator is significantly reduced.

Although certain presently preferred embodiments of the invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. An Active Side of a Fluid Transfer Coupling (FTC), comprising:
   a. a cylindrical chassis comprising an alignment cone having a front portion, a conical taper, and a rear portion, wherein the conical portion connects the front portion to the rear portion;
   b. a nozzle which attaches to and resides coaxially within the cone;
   c. a poppet valve positioned in the nozzle;
   d. a contamination cover configured to protect a sealing surface of the nozzle;
   e. an electrical thermal control system configured to condition the fluid media passing therethrough to a favorable temperature; and
   f. a fluid conduit connected to and in fluid communication with the nozzle.

2. The Active Side of claim 1, wherein the chassis is mounted on a mounting bracket.

3. The Active Side of claim 2, wherein the chassis is mounted to the mounting bracket by the means of a rotatable joint providing rotation in any three orthogonal axes.

4. The Active Side of claim 3, wherein spring biasing features are provided to center the chassis within the available rotational displacement of the rotatable joint.

5. The Active Side of claim 1, wherein the poppet valve comprises a poppet rod, a seal, and a seal retainer positioned inside the nozzle, and wherein the poppet rod is biased toward the front of the housing by a biasing member.

6. The Active Side of claim 5, wherein the poppet valve is fault-tolerant against the inability to close, as well as being fault-tolerant against the inability to open, due to the anti-jamming coil geometry provided in the biasing member.

7. The Active Side of claim 6, wherein the poppet rod comprises a hollow cylinder, the hollow cylinder containing openings thereon to provide fluid communication with a cavity of the nozzle.

8. The Active Side of claim 7, wherein the poppet rod incorporates guiding features to ensure that:
   a. no feature other than the intended sealing surface can make physical contact with the poppet seal;
   b. no feature other than the poppet seal can make physical contact with the corresponding seal surface; and
   c. the poppet seal does not participate in motion guidance of the poppet rod.

9. The Active Side of claim 8, in which the mutual geometries of the forward end of the nozzle and the seal retainer are selected to shield the seal from direct line-of-sight of exterior particle radiation.

10. The Active Side of claim 1, wherein the contamination cover is slidable within the rear portion and is biased toward the conical portion by a biasing member.

11. The Active Side of claim 10, wherein the contamination cover is fault-tolerant against the inability to close, as well as being fault-tolerant against the inability to open, due to the anti-jamming coil geometry provided in the biasing member.

12. The Active Side of claim 1, including a fluid conduit which connects the Active Side to a hosting asset.

13. The Active Side of claim 12, wherein the fluid conduit comprises a flexible hose assembly that bends and travels in synchronization with the extension/retraction stroke of the Active Side.

14. The Active Side of claim 13, wherein the flexible hose assembly incorporates said electrical thermal control system and a thermal blanket to condition the fluid media passing therethrough to a favorable temperature.

* * * * *